United States Patent
Brncick et al.

(10) Patent No.: US 9,022,475 B2
(45) Date of Patent: May 5, 2015

(54) COMPLIANT SHELL FOR VEHICLE SEAT

(75) Inventors: Gregory Brncick, Holland, MI (US); Christophe Aufrere, Monthery (FR); Andreas Kratz, Hespe (DE)

(73) Assignee: Faurecia Automotive Seating, Inc., Troy, MI (US)

( * ) Notice: Subject to any disclaimer, the term of this patent is extended or adjusted under 35 U.S.C. 154(b) by 293 days.

(21) Appl. No.: 13/290,925

(22) Filed: Nov. 7, 2011

(65) Prior Publication Data

US 2012/0119551 A1 May 17, 2012

Related U.S. Application Data

(60) Provisional application No. 61/412,698, filed on Nov. 11, 2010, provisional application No. 61/440,318, filed on Feb. 7, 2011.

(51) Int. Cl.
*B60N 2/64* (2006.01)
*B60N 2/50* (2006.01)

(52) U.S. Cl.
CPC *B60N 2/643* (2013.01); *B60N 2/50* (2013.01); *B60N 2/646* (2013.01)

(58) Field of Classification Search
USPC .......... 297/216.13, 216.14, 404, 396, 452.15, 297/452.54
See application file for complete search history.

(56) References Cited

U.S. PATENT DOCUMENTS

| | | | |
|---|---|---|---|
| 3,120,407 A * | 2/1964 | Propst | 297/452.19 |
| 3,565,482 A * | 2/1971 | Blodee | 297/284.3 |
| 5,577,811 A | 11/1996 | Ogg | |
| 6,523,892 B1 | 2/2003 | Kage et al. | |
| 6,896,324 B1 | 5/2005 | Kull et al. | |
| 7,320,503 B2 * | 1/2008 | Eysing | 297/452.63 |
| 8,029,055 B2 | 10/2011 | Hartlaub | |
| 2004/0183348 A1 | 9/2004 | Kniese | |
| 2006/0181126 A1 * | 8/2006 | Eysing | 297/284.1 |
| 2008/0272631 A1 * | 11/2008 | Hartlaub | 297/216.12 |
| 2010/0127541 A1 | 5/2010 | Kotz | |
| 2010/0176633 A1 | 7/2010 | Brncick et al. | |
| 2011/0121624 A1 | 5/2011 | Brncick et al. | |

FOREIGN PATENT DOCUMENTS

| | | |
|---|---|---|
| DE | 4121768 | 10/1992 |
| DE | 102005054125 | 11/2005 |
| EP | 1316651 | 6/2003 |

OTHER PUBLICATIONS

International search report from related PCT/US 11/59987 dated Mar. 27, 2012, 10 pages.

* cited by examiner

*Primary Examiner* — David R Dunn
*Assistant Examiner* — Timothy J Brindley
(74) *Attorney, Agent, or Firm* — Reising Ethington P.C.

(57) ABSTRACT

A vehicle seat includes a seat bottom and a seat back extending upwardly from the seat bottom. The seat back includes a backrest and a headrest.

23 Claims, 19 Drawing Sheets

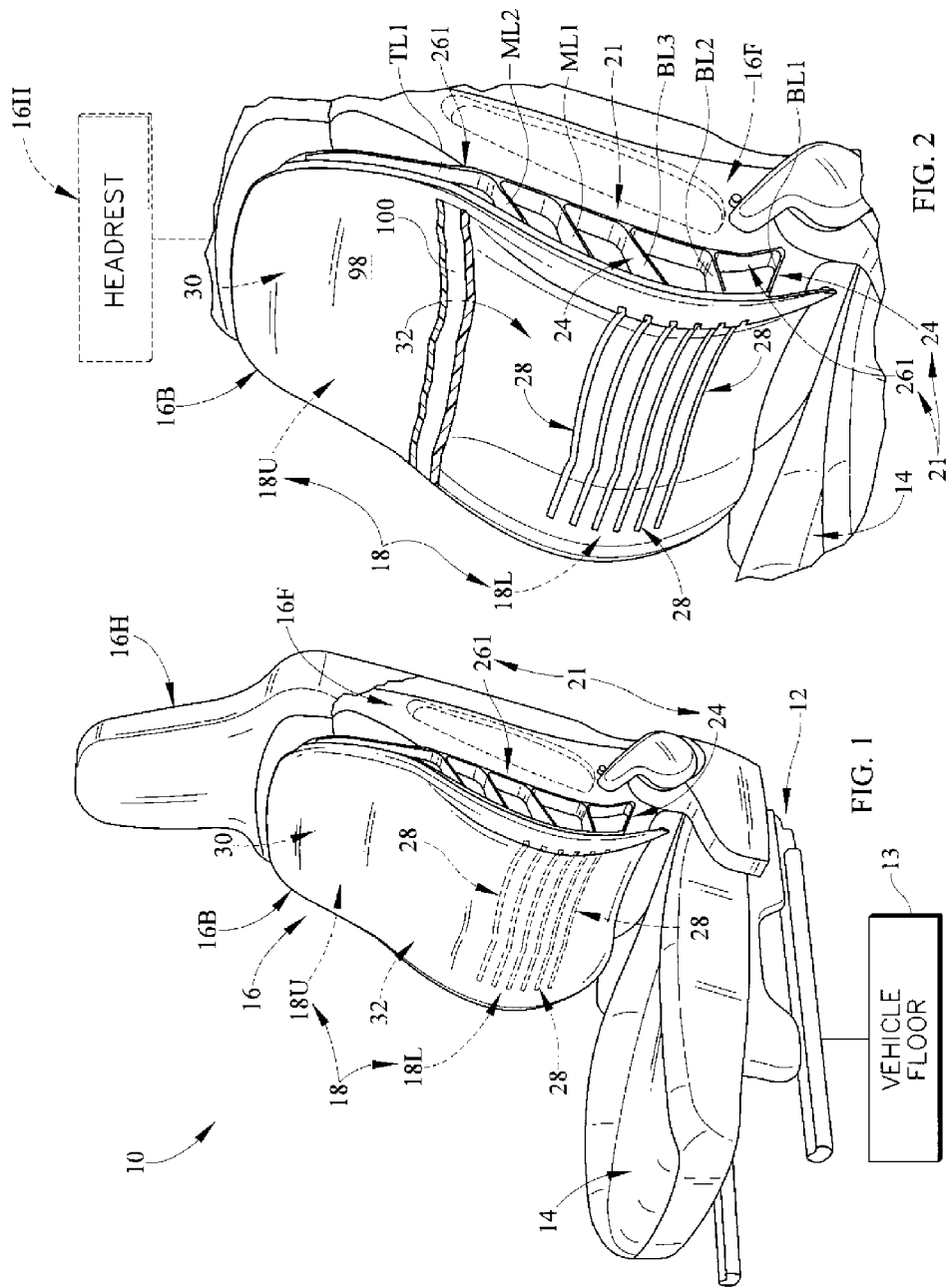

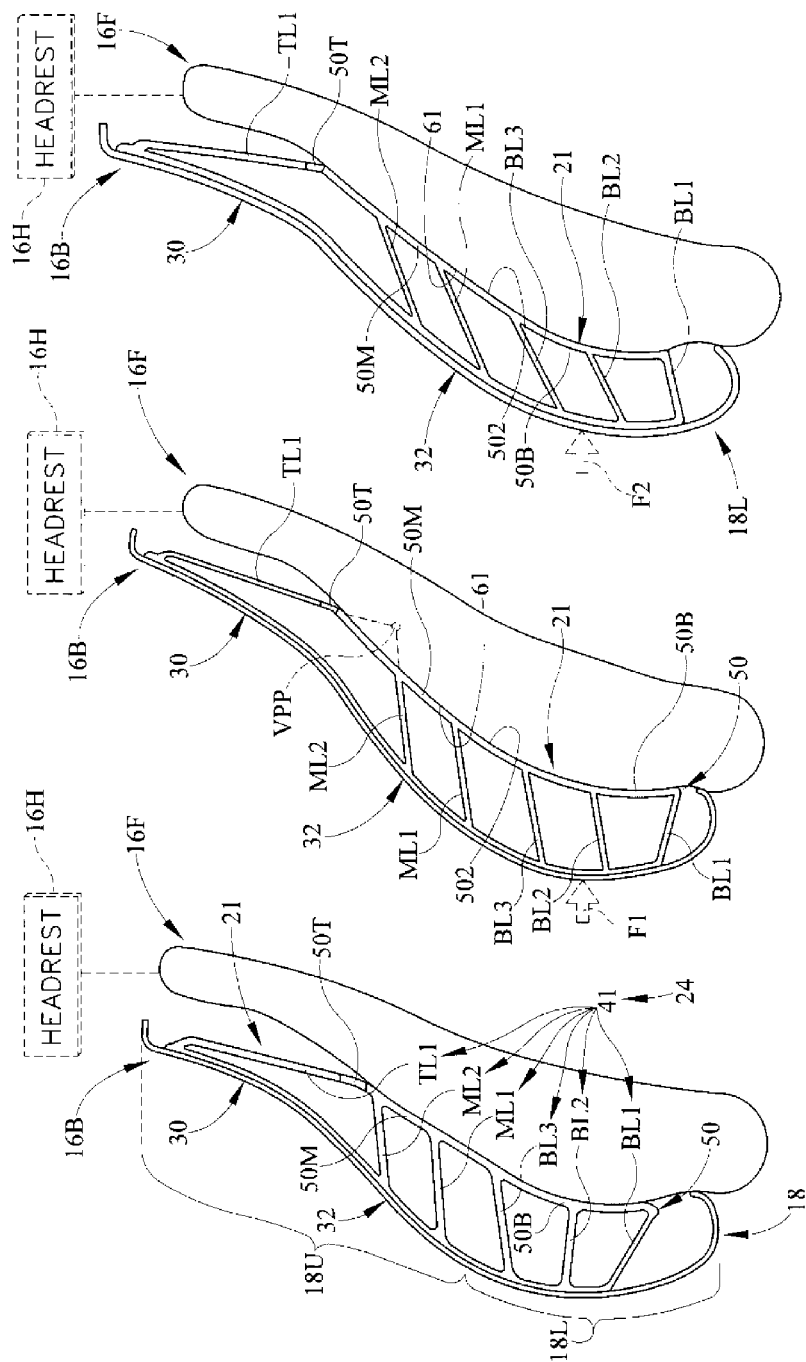

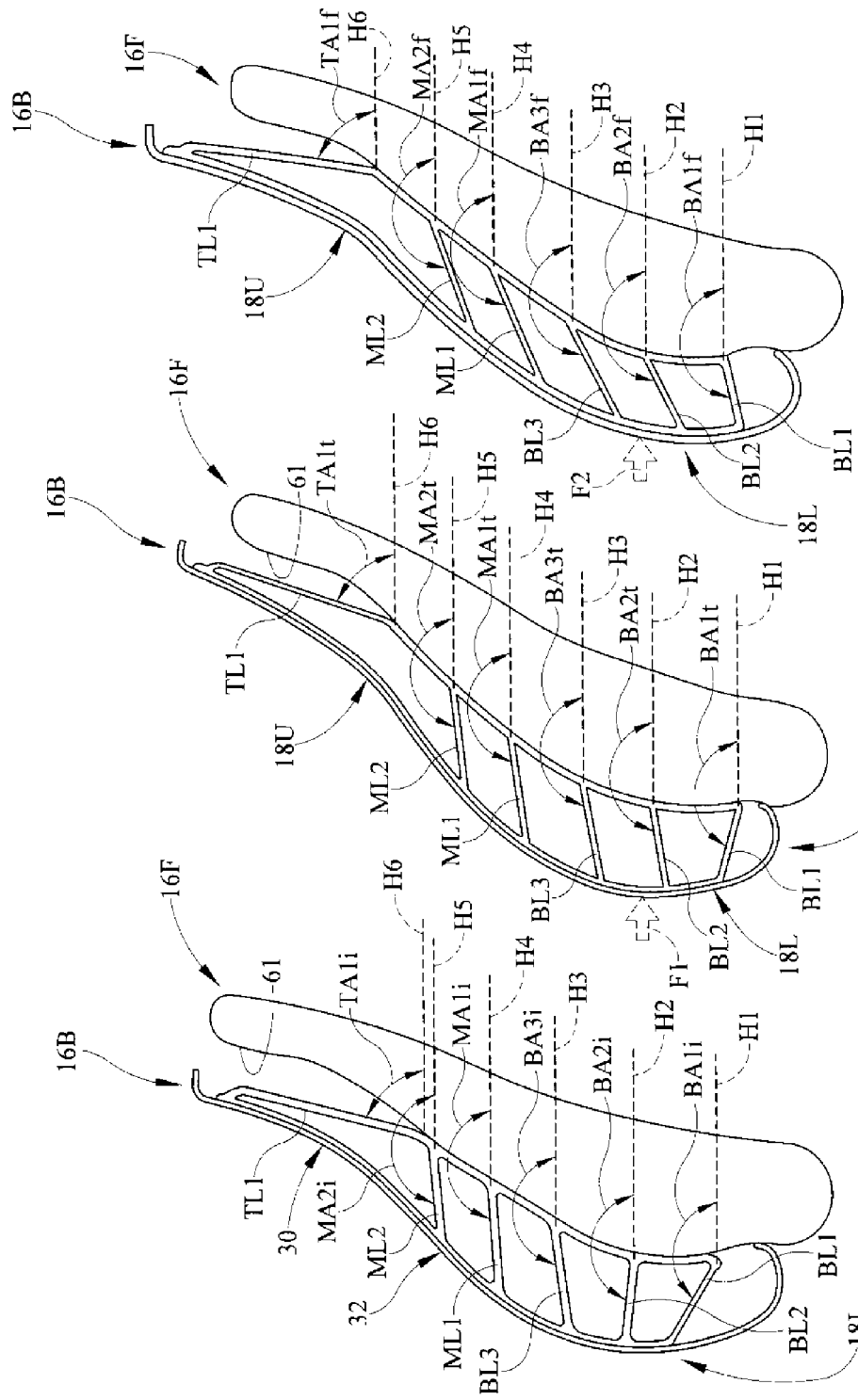

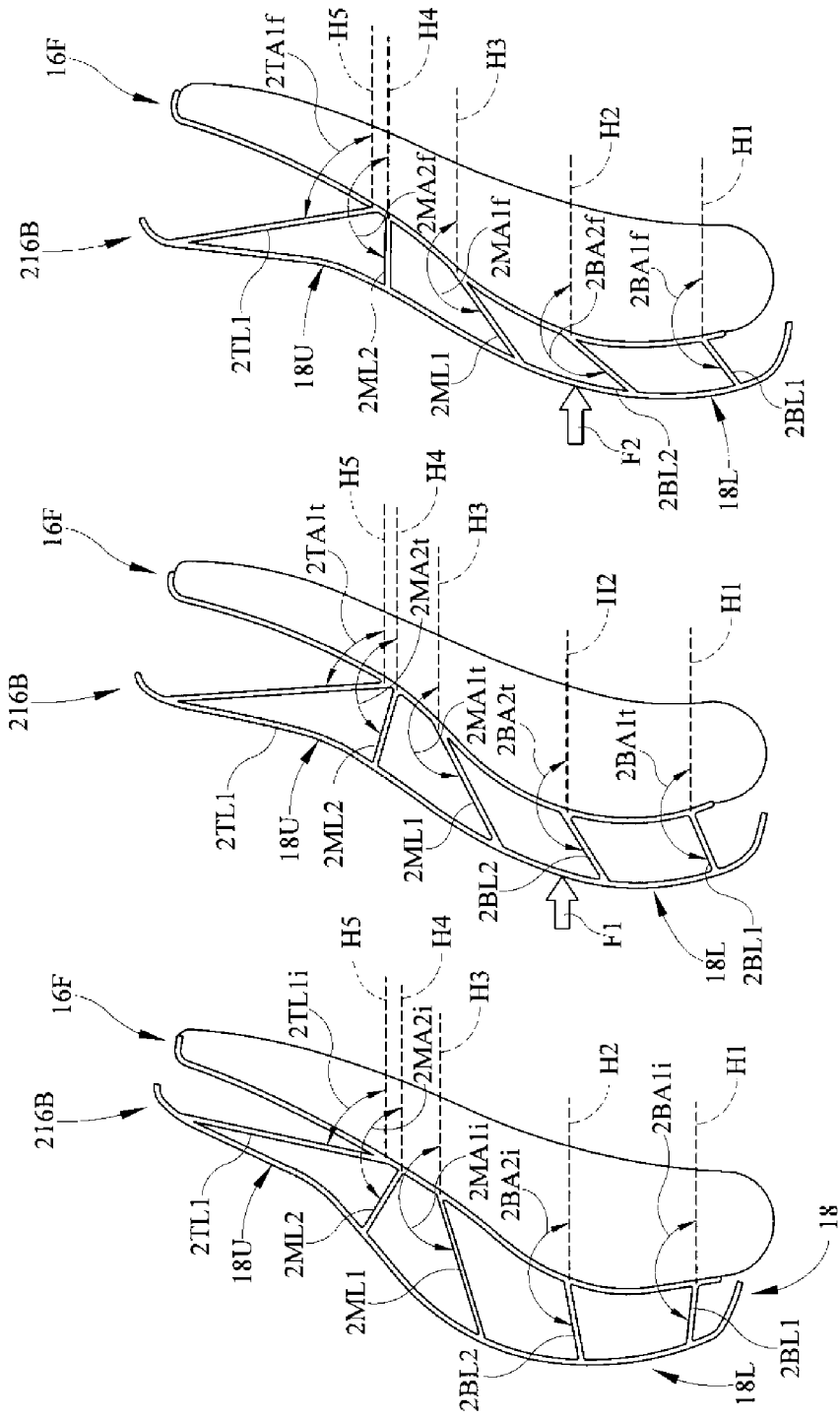

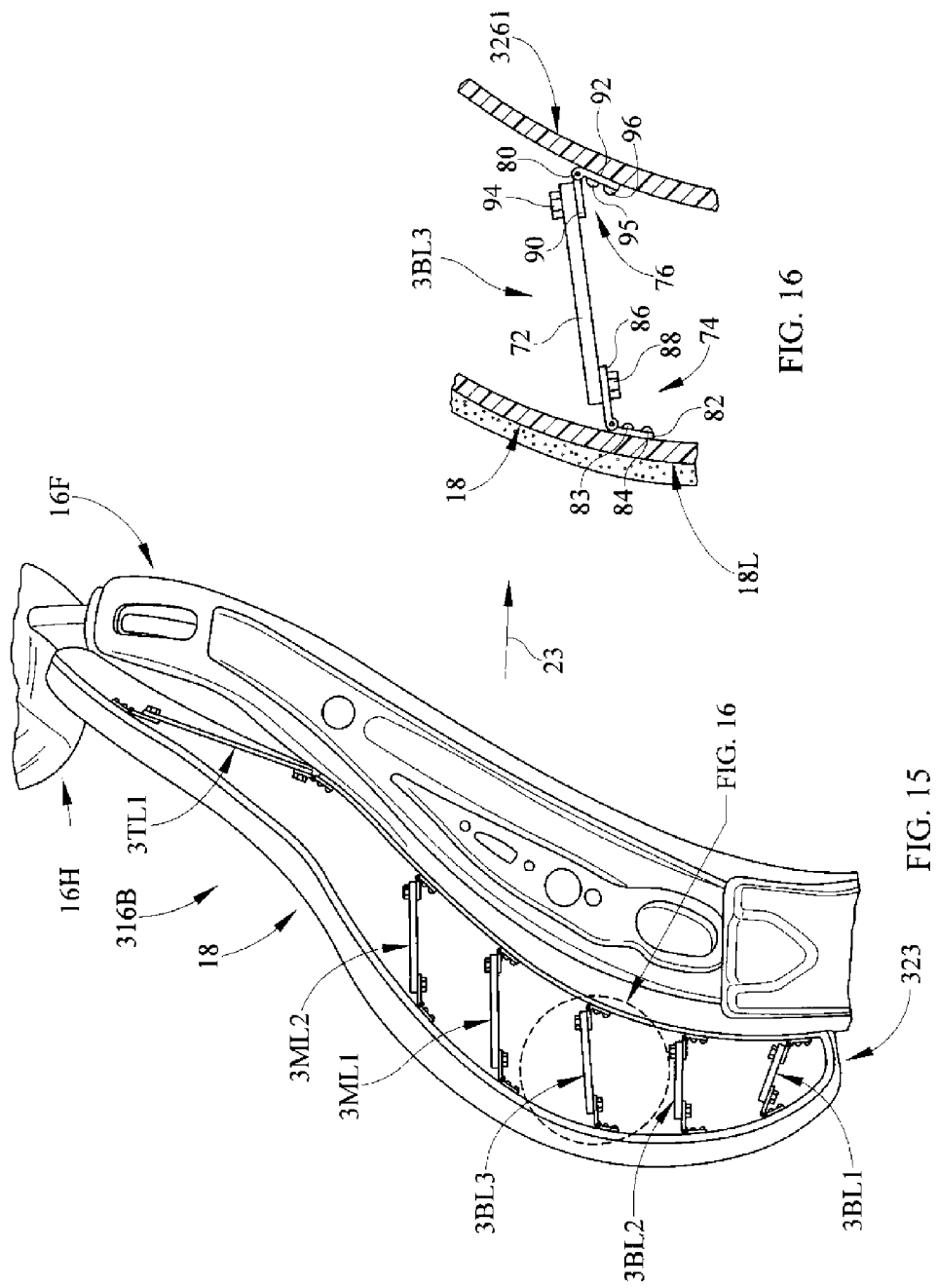

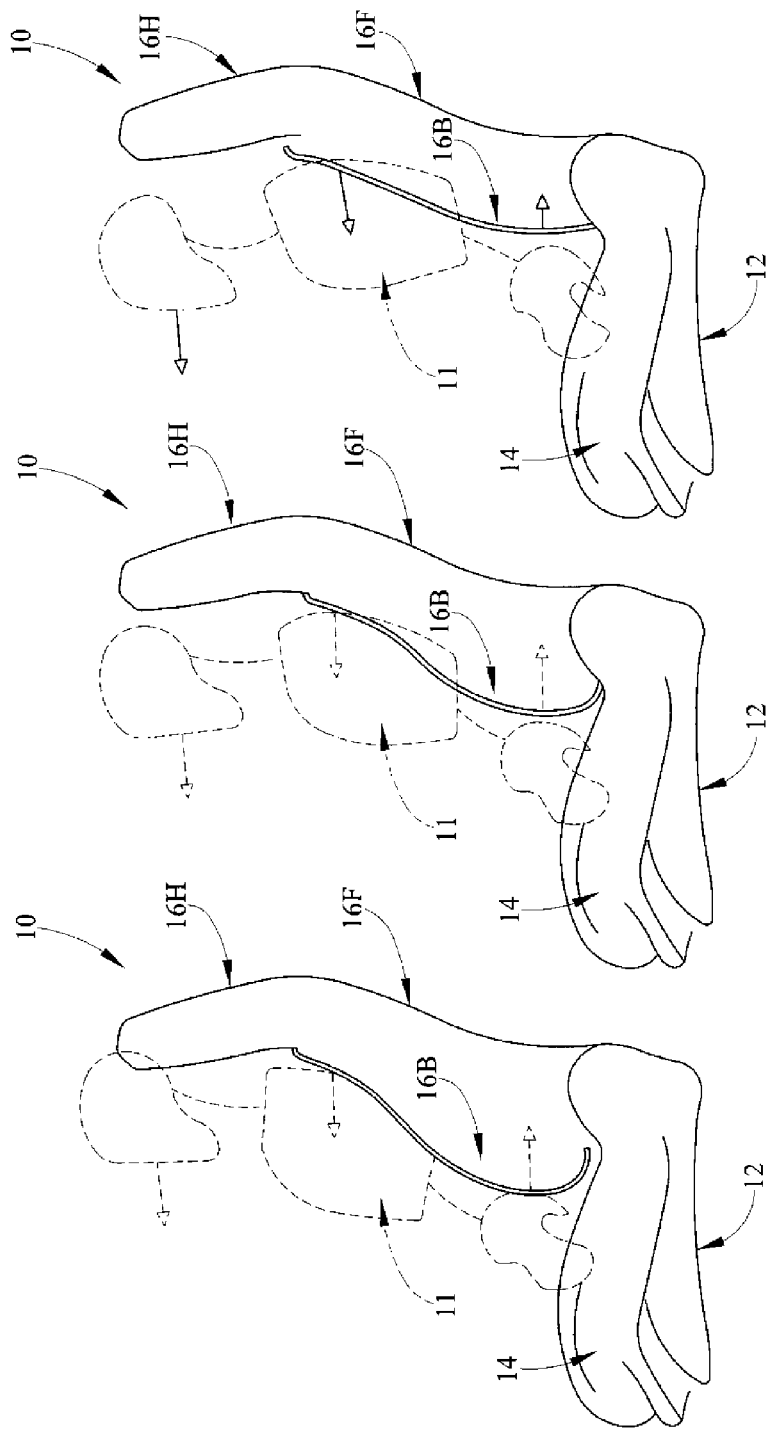

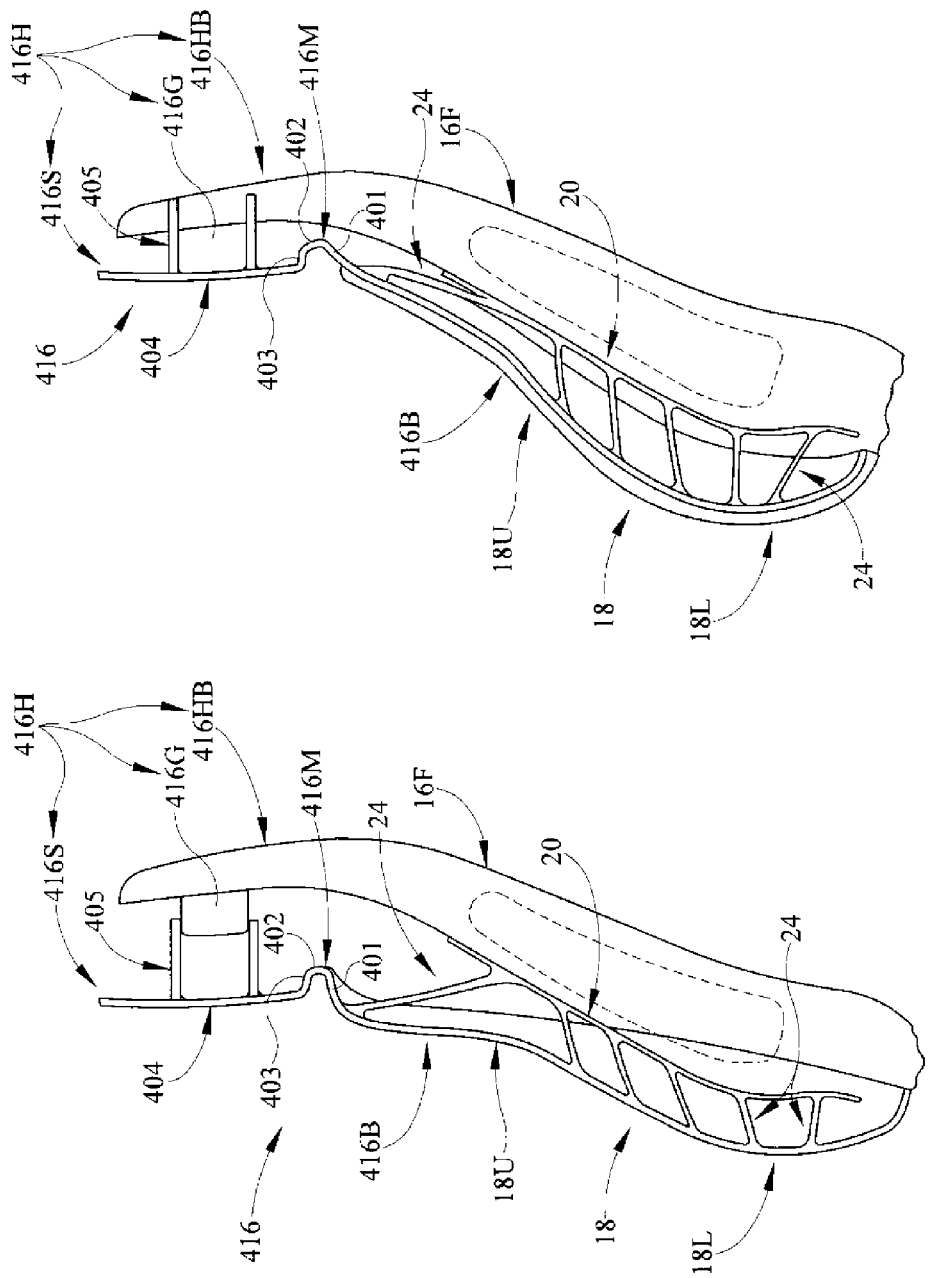

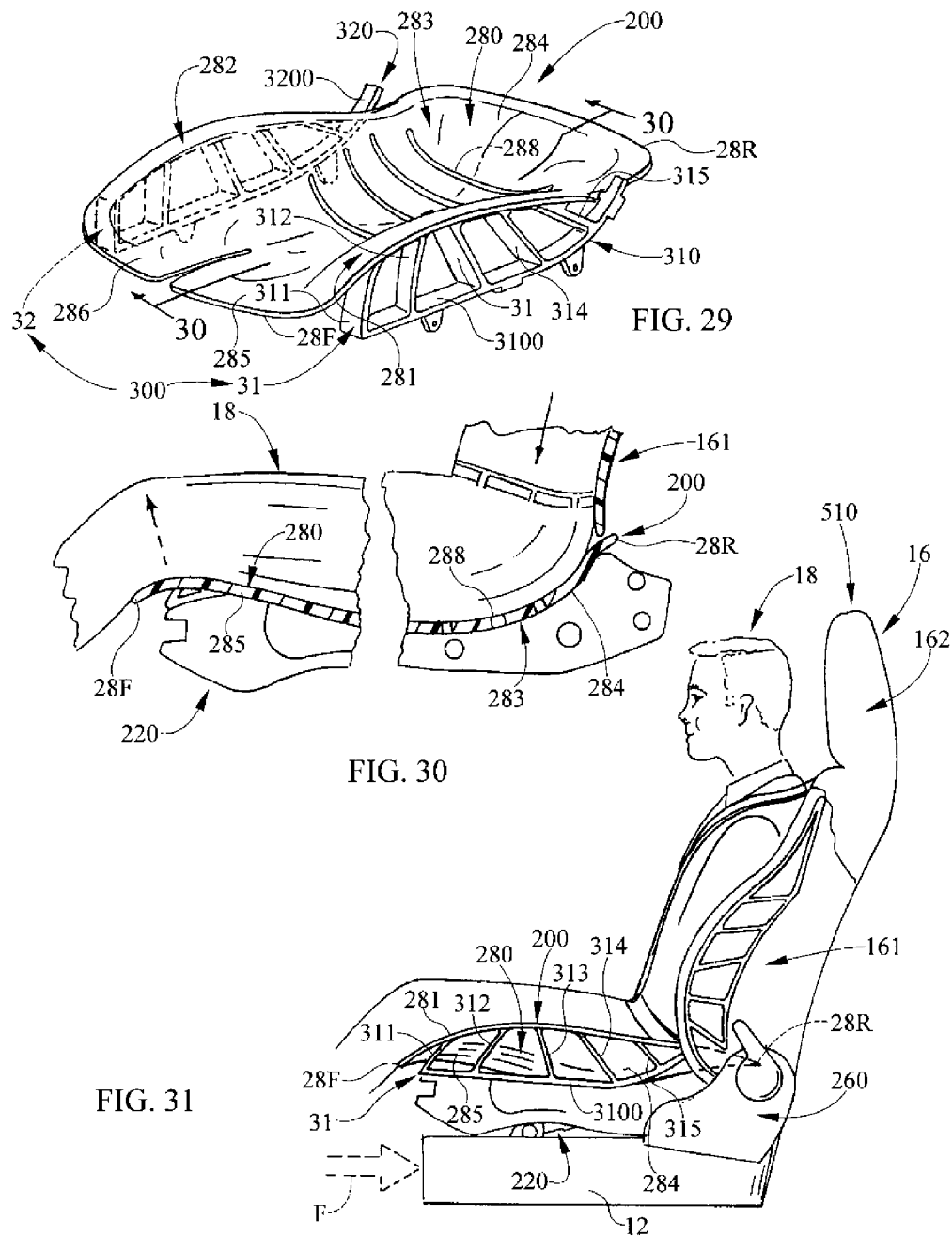

COMPLIANT SHELL FOR VEHICLE SEAT

PRIORITY CLAIM

This application claims priority under 35 U.S.C. §119(e) to U.S. Provisional Applications Ser. No. 61/412,698, filed Nov. 11, 2010 and Ser. No. 61/440,318, filed Feb. 7, 2011, which are expressly incorporated by reference herein.

BACKGROUND

The present disclosure relates to a vehicle seat, and particularly to a seat including an expandable and contractable portion. More particularly, the present disclosure relates to a vehicle seat having a variable shape.

SUMMARY

According to the present disclosure, a vehicle seat includes two occupant-support bases and a seat foundation for the occupant-support bases. One of the occupant-support bases is configured to provide a seat bottom arranged to lie above the seat foundation. The other occupant-support base is configured to provide a seat back extending upwardly from the seat bottom.

In illustrative embodiments, an occupant-support base in accordance with the present disclosure includes a variable-shape seat pan and a pan-support frame adjacent to the variable-shape seat pan. The variable-shape seat pan is configured to change shape in response to movement of an occupant seated on the variable-shape seat pan to enhance the comfort of the seated occupant.

In illustrative embodiments, the variable-shape seat pan includes a deformable seat shell and a compliant shell-motion controller located next to the deformable seat shell. The compliant shell-motion controller is configured to support the deformable seat shell as the seat shell deforms and changes shape during a shift in position and posture of a person seated on the occupant-support base. The compliant shell-motion controller functions to provide the deformable seat shell with a comfortable, customized, and sympathetic shape suited to persons seated in the vehicle seat as such persons move about while seated and restrained on the vehicle seat.

A seat back in accordance with the present disclosure includes a variable-shape seat pan that is arranged to lie in an upright orientation and configured to provide a backrest for a person seated on the seat bottom. The variable-shape seat pan of the seat back includes a deformable seat shell and a compliant shell-motion controller behind the deformable seat shell. The seat back also includes a pan-support frame coupled, for example, to the seat foundation. The pan-support frame of the seat back is arranged to lie behind the upright variable-shape seat pan and mate with the compliant shell-motion controller included in the upright variable-shape seat pan to allow the deformable seat shell to deform and change shape sympathetically during a shift in position and posture of a person seated on the seat bottom to lie against the deformable seat shell.

In illustrative embodiments, the compliant shell-motion controller in the seat back is configured to provide means for supporting the deformable seat shell for predictable shape-changing movement relative to the pan-support frame from an initial (lordosis) seat-shell shape to a final (kyphosis) seat-shell shape in response to a force applied to the deformable seat shell in a direction toward the pan-support frame by a person sitting on the seat bottom as the person moves around and changes position in the vehicle seat so that a back of the person is supported automatically by the deformable seat shell in a customized manner regardless of the posture of the seated person. The compliant shell-motion controller in the seat back is located between and coupled to the pan-support frame and the deformable seat shell.

A seat bottom in accordance with the present disclosure includes a variable-shape seat pan arranged to lie in a generally horizontal orientation and a pan-support frame arranged to lie below the variable-shape seat pan. The variable-shape seatpan includes a deformable seat shell and a compliant shell-motion controller located under the deformable seat shell. The pan-support frame of the seat bottom is arranged to lie under the horizontal variable-shape seat pan and mate with the compliant shell-motion controller included in the horizontal variable-shape seat pan to allow the deformable seat shell to deform and change shape sympathetically during a shift in position and posture of a person seated and restrained on the seat bottom.

Occupant movement on the seat bottom sufficient to cause a change in the shape of the deformable seat shell can be initiated by the occupant or caused, for example, by application of external impact forces applied to a vehicle carrying the vehicle seat. The deformable seat shell in the seat bottom can change in shape in accordance with the present disclosure from a normal first seat-shell shape into a second seat-shell shape to cause the knees of the seated occupant to be raised upwardly away from the vehicle floor as the bottom of the seated occupant is lowered downwardly toward the vehicle floor so as to minimize forward sliding motion of the seated and restrained occupant on the seat bottom during, for example, exposure of the vehicle to an external impact.

A compliant shell-motion controller included in a seat back or a seat bottom in accordance with the present disclosure includes a link foundation and several free-pivoting links coupled to the link foundation and a companion deformable seat shell. The link foundation is coupled to the companion pan-support frame to lie in a fixed position relative to the pan-support frame during shape-changing movement of the deformable seat shell relative to the pan-support frame. The free-pivoting links are arranged to lie between and to interconnect the link foundation and the deformable seat shell to cause the deformable seat shell to move in a controlled manner relative to the link foundation when the deformable seat shell is exposed to external forces generated by a person moving around and changing position in the vehicle seat. In illustrative embodiments, the deformable seat shell and free-pivoting links and the link foundation of the compliant shell-motion controller cooperate to form a monolithic element made of an elastic plastics material.

In illustrative embodiments, the deformable seat shell included in a seat back or a seat bottom in accordance with the present disclosure extends laterally across the width of the pan-support frame. The compliant shell-motion controller includes a first shell mount coupled to a first (near) side of the deformable seat shell and a second shell mount coupled to a second (far) side of the deformable seat shell and arranged to lie in laterally spaced-apart relation to the first shell mount. Each of the shell mounts includes a link foundation anchored to lie in a stationary position on the support frame and several free-pivoting links interconnecting the deformable seat shell and the companion link foundation. In illustrative embodiments, the deformable seat shell and the first and second shell mounts cooperate to form a monolithic element made of a plastics material.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a front perspective view of a vehicle seat including a seat bottom and a seat back mounted on an underlying seat foundation coupled to a floor of a vehicle and showing that the seat back provides an occupant-support base in accordance with the present disclosure, the seat back includes an upright variable-shape seat pan providing a backrest, a pan-support frame lying behind the backrest, and a headrest extending upwardly from the pan-support frame;

FIG. 2 is an enlarged partial perspective view of the seat back of FIG. 1, with portions broken away, showing that the seat back includes an occupant-controlled upright variable-shape seat pan including a deformable seat shell and a compliant shell-motion controller behind the deformable seat shell, the deformable seat shell is formed to include several horizontally extending slots and arranged to lie under a seat cover also included in the seat back, and the compliant shell-motion controller includes a link foundation coupled to the pan-support frame and a companion series of free-pivoting links that cooperate to control motion of the seat shell as suggested in FIGS. 8A-10B in response to motion-inducing forces applied to the seat shell by a person seated in the vehicle seat as that person changes position (e.g., posture) while seated in the vehicle seat suggested in FIGS. 19-21;

FIGS. 8A-10A illustrate, in sequence, use of the first series of six links included in the first shell mount to control deformation and shape change of the deformable seat shell in response to forces applied by a seated person to the deformable seat shell when the seated person changes position while seated in the vehicle seat as shown, for example, in FIGS. 19-21 to vary lumbar-support characteristics of the deformable seat shell to suit the person seated in the vehicle seat whether that person sits upright or slouches or sits in some transition position therebetween;

FIG. 8A is an enlarged elevation view of the seat back of FIGS. 1-4 showing that the deformable seat shell assumes in an initial (lordosis) seat-shell shape when the vehicle seat is unoccupied as shown in FIG. 1 and when a person is seated in an upright position on the seat bottom as suggested in FIG. 19;

FIG. 9A is a view similar to FIG. 8A showing the deformable seat shell after it has been deformed by a person sitting in a mid-range position to assume a transition seat-shell shape as suggested in FIG. 20;

FIG. 10A is a view similar to FIGS. 8A and 9A showing the deformable seat shell after it has been deformed by a person sitting in a slouch position to assume a final (kyphosis) seat-shell shape;

FIG. 8B is a view similar to FIG. 8A showing an initial included angle defined between each link in the first series of links and a horizontal reference line when the deformable seat shell assumes the initial (lordosis) seat-shell shape;

FIG. 9B is a view similar to FIG. 9A showing a transition angle defined between each link in the series of links and a horizontal reference line when the deformable seat shell assumes the transition seat-shell shape;

FIG. 10B is a view similar to FIG. 10A showing a final angle defined between each link in the series of links and a horizontal reference line when the deformable seat shell assumes the final (kyphosis) seat-shell shape;

FIGS. 12-14 illustrate in sequence use of the first series of five flexible links included in the upright variable-shape seat pan (backrest) of FIG. 11 to deform and otherwise change the shape of the deformable seat shell to vary lumbar-support characteristics of the deformable seat shell to suit the person seated in the vehicle seat;

FIG. 12 is an enlarged elevation view of the seat back of FIG. 11 showing the deformable seat shell characterized by an initial (lordosis) seat-shell shape;

FIG. 13 is a view similar to FIG. 12 showing the deformable seat shell in a transition position;

FIG. 14 is a view similar to FIGS. 12 and 13 showing the deformable seat shell characterized by a final (kyphosis) seat-shell shape;

FIG. 15 is an elevation view of yet another embodiment of a seat back providing an occupant-support base in accordance with the present disclosure showing an upright variable-shape seat pan (backrest) in an initial position and showing that the upright variable-shape seat pan (backrest) included in the seat back comprises an occupant-controlled deformable seat shell and a first shell mount comprising a stationary link foundation (e.g., curved strip) and a first series of six free-pivoting links interconnecting the deformable seat shell and the link foundation;

FIG. 16 is an enlarged elevation view taken from a circled region of FIG. 15 showing that each free-pivoting link includes a link bar, a first hinge coupling the link bar to the seat shell for pivotable movement about a first pivot axis, and a second hinge coupling the link bar to the first link foundation for pivotable movement about a second pivot axis;

FIGS. 19-21 are a series of views showing an occupant sitting on the seat bottom of a vehicle seat that includes an occupant-controlled deformable seat shell in accordance with the present disclosure and showing interaction between the occupant and the deformable seat shell as the occupant shifts position and posture in the vehicle seat;

FIG. 19 is an elevation view of a vehicle seat in accordance with the present disclosure showing a person sitting in an upright position on the seat bottom causing the deformable seat shell to assume an initial (lordosis) seat-shell shape;

FIG. 20 is a view similar to FIG. 19 showing a person sitting in a mid-range position on the seat bottom causing the deformable seat shell to assume a transition seat-shell shape;

FIG. 21 is a view similar to FIG. 20 showing a person sitting in a slouch position on the seat bottom causing the deformable seat shell to assume a final (kyphosis) seat-shell shape;

FIGS. 22 and 23 are a diagrammatic views similar to FIG. 8A showing a seat back in accordance with another embodiment of the present disclosure including a headrest comprising a compliant head-restraint shuttle that is coupled to the upright variable-shape seat pan (backrest) to move therewith relative to a shuttle-guide mount coupled to the pan-support frame;

FIG. 22 is a diagrammatic side elevation view showing the compliant head-restraint shuttle in a forwardly displaced position;

FIG. 23 is a view similar to FIG. 23 showing the compliant head-restraint shuttle in a rearwardly displaced position;

FIGS. 29-31 show the seat pan of FIGS. 24-28 when the deformable seat shell is characterized by a normal (as-molded) first seat-shell shape;

FIG. 29 is a perspective view similar to FIG. 27 showing that a rearward portion (on the right) of the deformable seat shell is formed to include several laterally extending slots and that a forward portion (on the left) of the deformable seat shell is formed to include a longitudinally extending slot in the middle of the seat shell to provide left and right leg-support sections that are able to flex independently of one another during a change in shape of the deformable seat shell;

FIG. 30 is a sectional view taken along line 30-30 of FIG. 29 showing a person seated on the top surface of the deformable seat shell of the variable-shape seat pan (the seat cover is not shown) when the deformable seat shell is moved to assume the normal (as-molded) first seat-shell shape;

FIG. 31 is a view of a seated and restrained person in the vehicle seat of FIG. 24 when the deformable seat shell is characterized by the normal (as-molded) seat-shell shape and the free-pivoting links included in the first shell mount are also in normal (as-molded) positions prior to exposure of the vehicle including the vehicle seat to an external impact force (shown in phantom since it has not yet been applied to the vehicle);

FIG. 32 is a perspective view similar to FIG. 29 but showing the deformable seat shell of the variable-shape seat pan in an impact-generated second seat-shell shape;

FIG. 33 is a sectional view taken along line 33-33 of FIG. 32 showing a person seated on the top surface of the deformable seat shell of the variable-shape seat pan (the seat cover is not shown) when the deformable seat shell is moved to assume the impact-generated second seat-shell shape causing the knees of the seated person to be raised upwardly away from the vehicle floor as the bottom of the seated person is lowered downwardly toward the vehicle floor to minimize forward sliding motion of the seated and restrained person on the seat bottom during exposure of the vehicle to an external impact;

FIG. 34 is a view of a seated and restrained person in the vehicle seat when the deformable seat shell has been moved to assume the impact-generated second seat-shell shape and the free-pivoting links included in the first shell mount have also moved to assume new slopes in response to exposure of the vehicle including the vehicle seat to an external impact force (represented by a double arrow);

DETAILED DESCRIPTION

Figure 3:
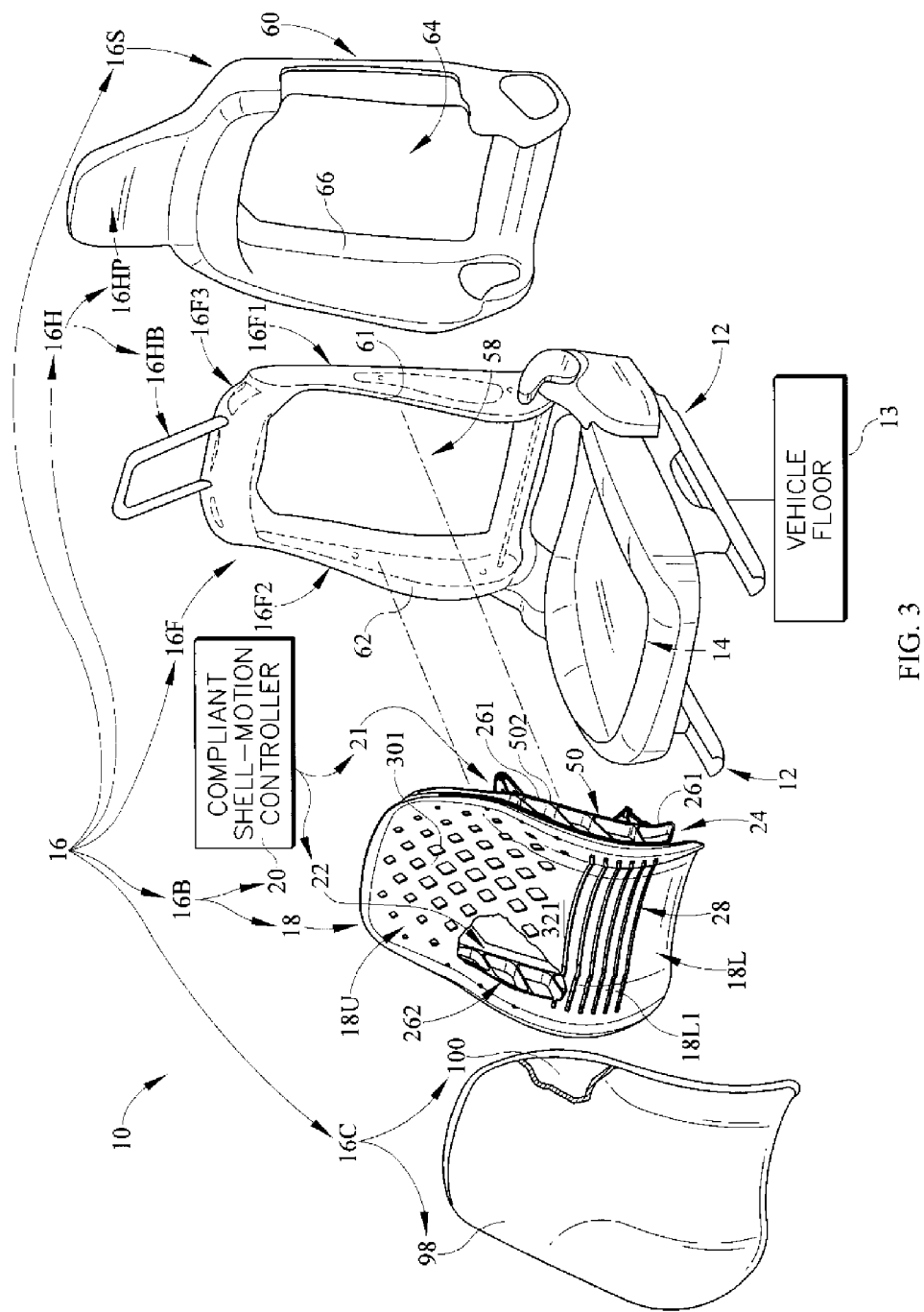
FIG. 3 is an exploded perspective assembly view of illustrative components included in the vehicle seat showing that the vehicle seat includes a seat foundation anchored to an underlying vehicle floor, a seat bottom coupled to the underlying seat foundation, and a seat back including a pan-support frame coupled to the underlying seat foundation and arranged to extend upwardly from a rear portion of the seat bottom, an upright variable-shape seat pan providing a backrest arranged to mount on a front side of the pan-support frame, and a headrest, and showing that the seat back also includes a rear frame shield arranged to mount on a rear side of the pan-support frame and a seat-shell cover arranged to mount on a front side of a deformable seat shell included in the upright variable-shape seat pan (backrest)

A vehicle seat 10 includes a seat foundation 12 adapted to be anchored to a vehicle floor 13, a seat bottom 14 mounted on seat foundation 12, and a seat back 16 arranged to extend upwardly from seat bottom 14 as suggested in FIGS. 1-4. Seat back 16 provides an occupant-support base that is configured to include compliant features in accordance with the present disclosure to change shape sympathetically as suggested in FIGS. 8A-10A and 19-21 in response to a shift in position and posture of a person seated on seat bottom 14 to enhance the comfort of that person as that person moves around and changes position in vehicle seat 10. Seat bottom 14 provides an occupant-support base that is configured to include compliant features in accordance with the present disclosure to change shape sympathetically as suggested in FIGS. 24-36 in response to movement of a person seated on seat bottom 14 or application of external impact forces to a vehicle carrying vehicle seat 10.

Seat back 16 includes an upright variable-shape seat pan (backrest) 16B that is made in accordance with the present disclosure to provide a compliant shell system that provides custom lumbar support to upright-sitting, position-changing, and slouching persons seated on vehicle seat 10 as suggested, for example, in FIGS. 8A-10A and 19-21. A seat back 16 in accordance with a first embodiment of the present disclosure is shown in FIGS. 1-10. A seat back 216 in accordance with a second embodiment is shown in FIGS. 11-14 while a seat back 316 in accordance with a third embodiment is shown in FIGS. 15-18. A seat back in accordance with a fourth embodiment is shown in FIGS. 22 and 23.

Figure 24:
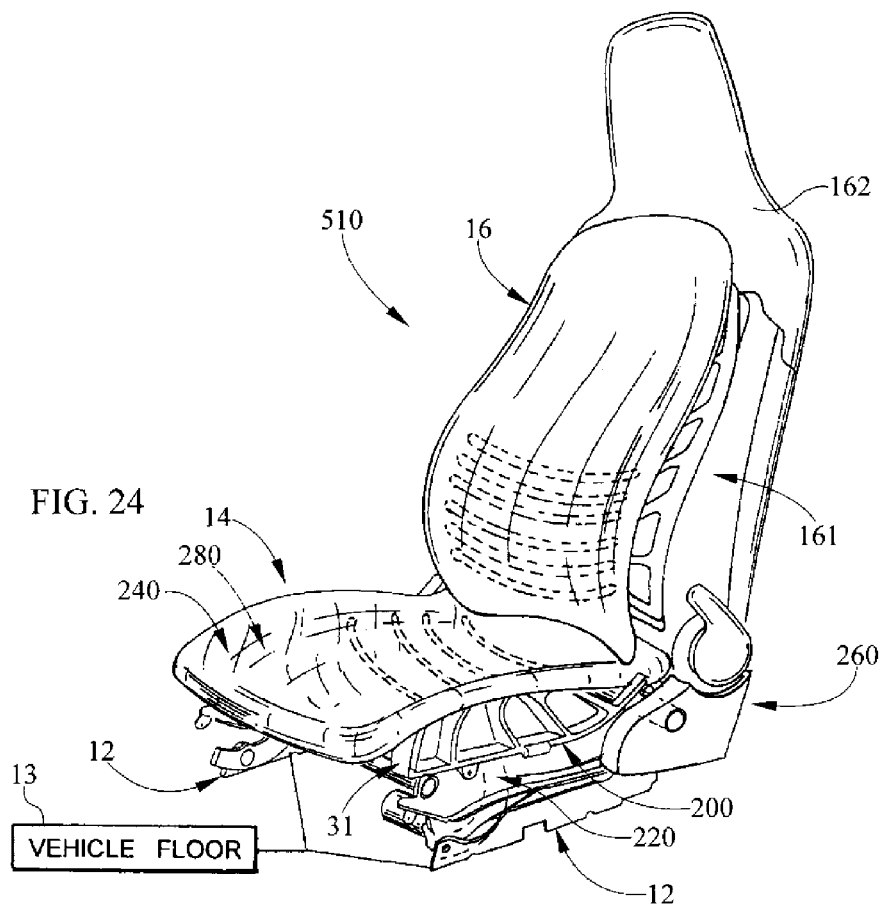
FIG. 24 is a front perspective view of a vehicle seat including a seat back and a seat bottom made in accordance with the present disclosure and mounted on an underlying seat foundation coupled to a floor of a vehicle and showing that the seat bottom includes a variable-shape seat pan and a pan-support frame lying below the variable-shape seat pan and mating with two frame-support rails lying in spaced-apart relation to one another and anchored to the vehicle floor to provide the seat foundation.
Figure 25:
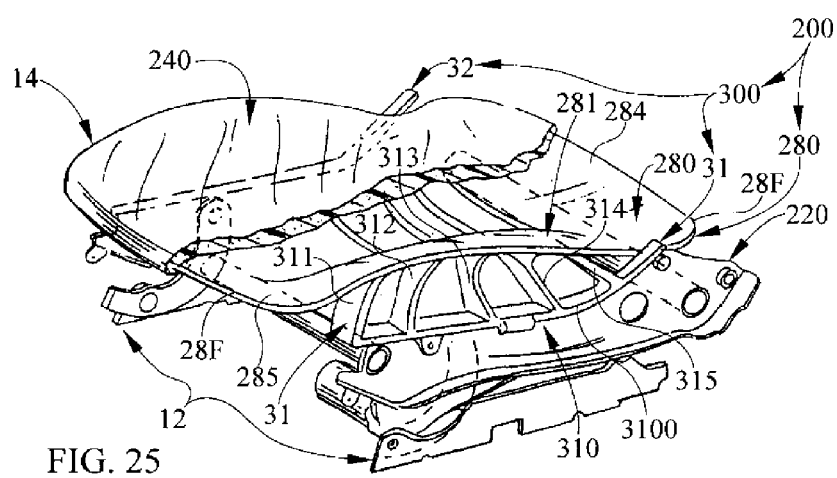
FIG. 25 is an enlarged perspective view of the seat bottom and underlying seat foundation of FIG. 24, with portions broken away, showing that the variable-shape seat pan includes a deformable seat shell formed to include several horizontally extending slots and arranged to lie under a seat cover also included in the seat bottom and a compliant shell-motion controller located under the deformable seat shell and configured to support the deformable seat shell as the seat shell deforms and changes shape during a shift in position and posture of a passenger seated and restrained on the seat bottom caused, for example, by application of external impact forces applied to a vehicle carrying the vehicle seat from a normal first seat-shell shape shown, for example, in FIGS. 24, 25, 29-31, and 35 to an impact-generated second seat-shell shape shown, for example, in FIGS. 32-34 and 36 in which the knees of the seated person are raised upwardly away from the vehicle floor as the bottom of the seated person is lowered downwardly toward the vehicle floor to minimize forward sliding motion of the seated and restrained person on the seat bottom during exposure of the vehicle to an external impact.
Figure 33:
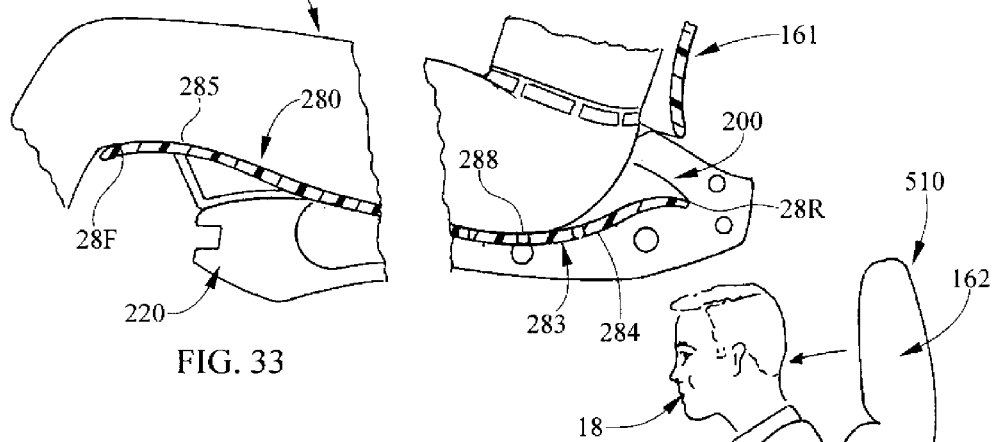
Figure 34:
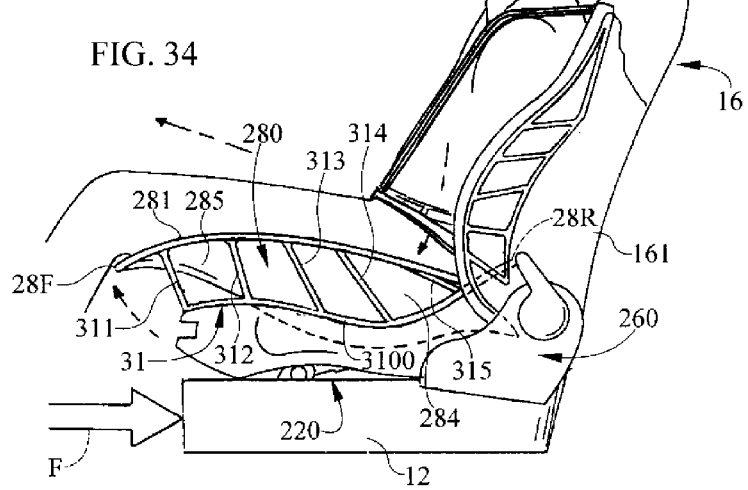

Seat bottom 14 includes a variable-shape seat pan 200 that is arranged to underlie and support a passenger 18 that is seated on seat bottom 14 as suggested in FIGS. 24, 31, and 34. Variable-shape seat pan 200 is configured to change shape in response to a shift in position or a change in posture of the seated passenger 18 from an initial seat-pan shape shown, for example, in FIGS. 29-31 and 35 to a subsequent seat-pan shape shown, for example, in FIGS. 32-34 and 36. The position shift or posture change of the seated passenger 18 can take place on the initiative of passenger 28 or in response, for example, to exposure of a vehicle including vehicle seat 10 to an external impact force F.

Seat Back

Figures 4, 5:
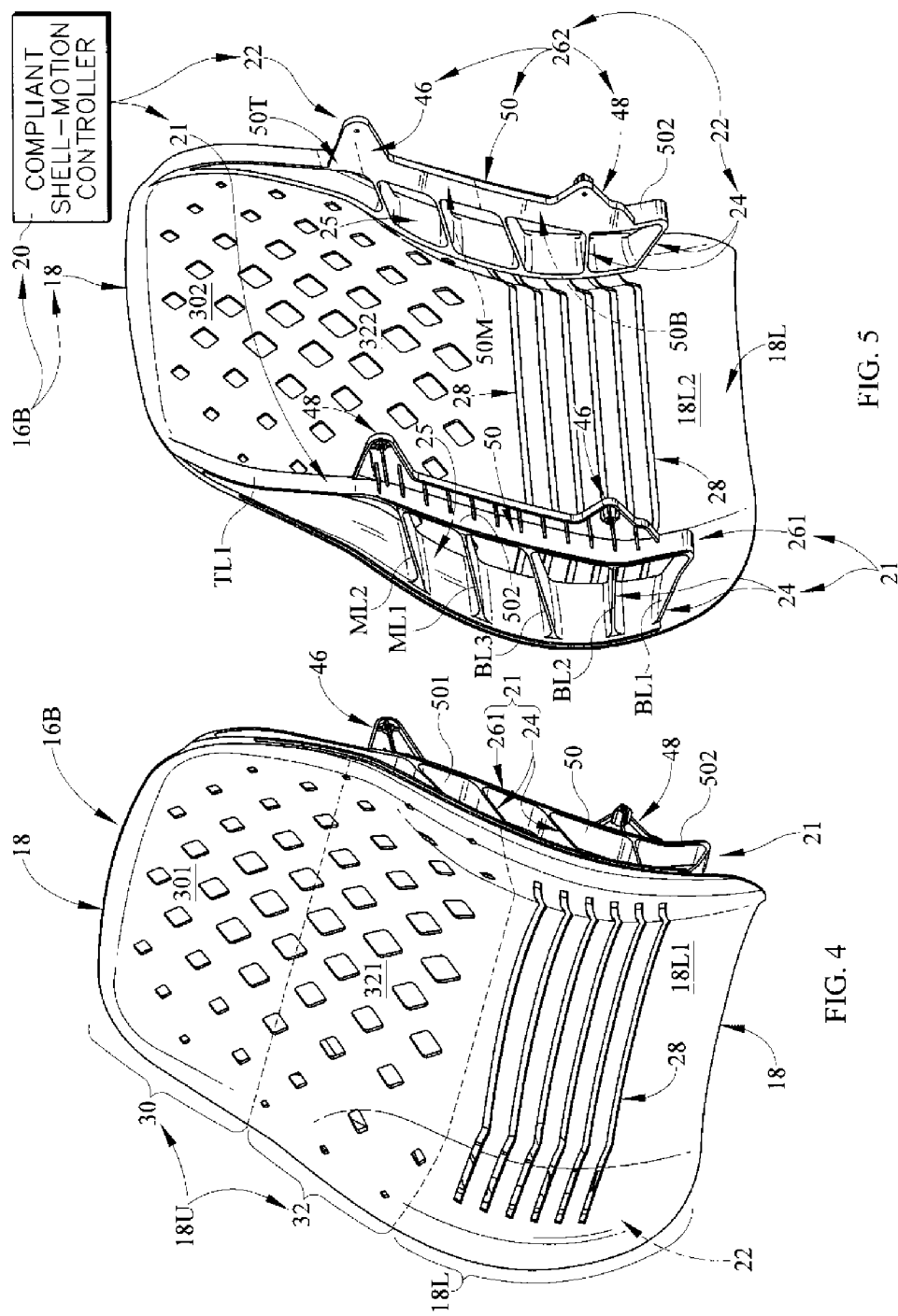
FIG. 4 is an enlarged front perspective view of the upright variable-shape seat pan (backrest) of FIGS. 1-3 showing that the backrest includes a deformable seat shell configured to deform and change shape sympathetically during a shift in position of a person leaning against the backrest as suggested in FIGS. 19-21.
FIG. 5 is a rear perspective view of the upright variable-shape seat pan (backrest) of FIGS. 1-3 showing that the backrest includes a compliant shell motion controller comprising a first shell mount coupled to a near side of the deformable seat shell and a second shell mount coupled to a far side of the deformable seat shell and showing that each shell mount includes a link foundation adapted to mount on the pan-support frame of the seat back and six free-pivoting links interconnecting the link foundation and the deformable seat shell.
Figure 6:
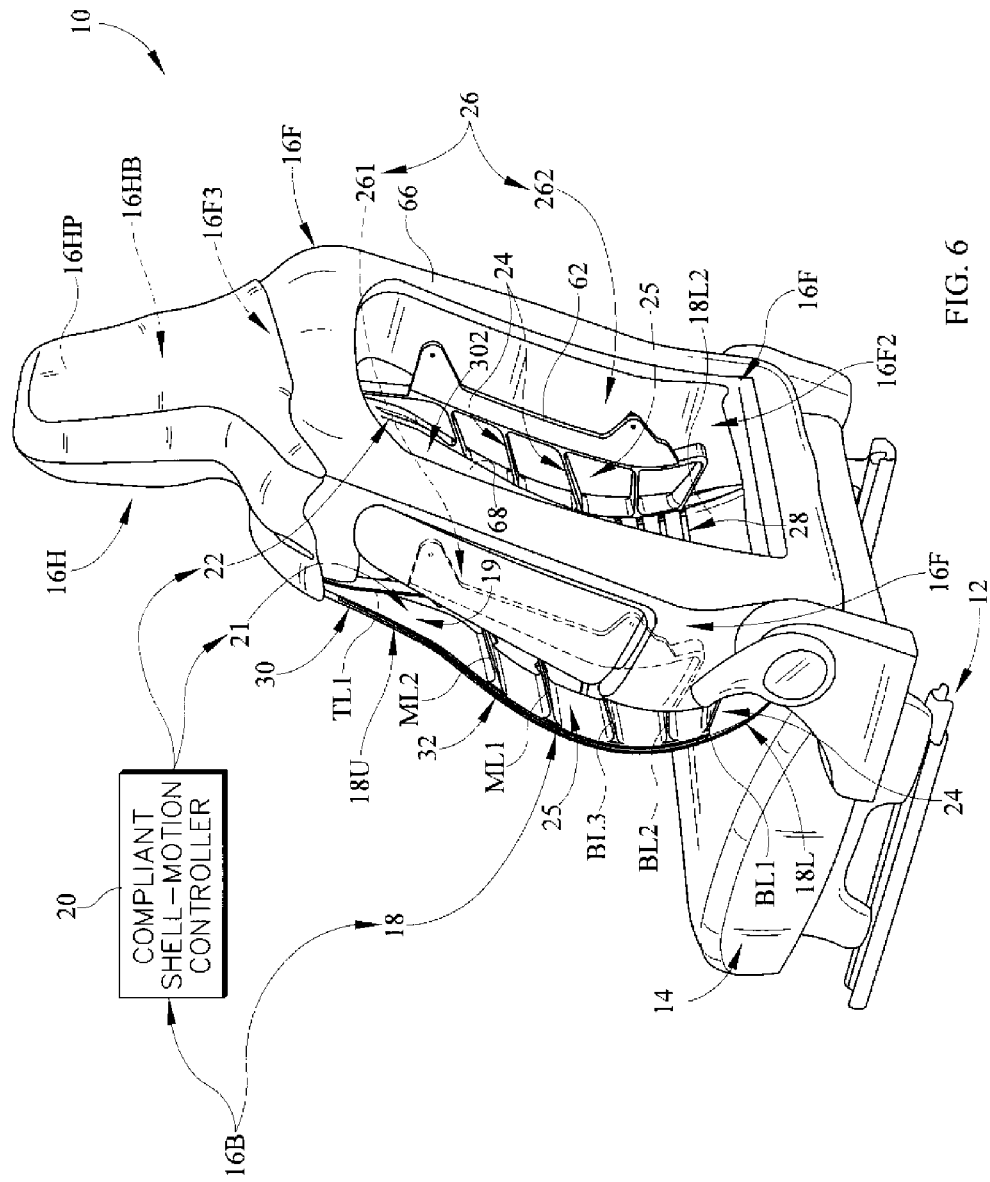
FIG. 6 is rear perspective view of the vehicle seat of FIGS. 1 and 3 showing that the first shell mount is coupled to the near side of the deformable seat shell and the second shell mount is coupled to the far side of the deformable seat shell and that the first and second shell mounts cooperate to define a compliant shell-motion controller configured to operate as suggested in FIGS. 8A-10A to support the deformable seat shell as it changes shape in response to shifting torso movement of a seated person as suggested in FIGS. 19-21.

Upright variable-shape seat pan (backrest) 16B in seat back 16 includes an occupant-controlled deformable seat shell 18 as shown, for example, in FIGS. 4-6 supported on a compliant shell-motion controller 20. Occupant-controlled deformable seat shell 18 varies predictably in shape between an initial (lordosis) seat-shell shape shown in FIG. 8A suited to support an upright seated person as suggested in FIG. 19, a transition (mid-range) seat-shell shape shown in FIG. 9A to support a seated person transitioning between upright and slouching positions as suggested in FIG. 20, and a final (kyphosis) seat-shell shape shown in FIG. 10A suited to support a slouching seated person as suggested in FIG. 21. Compliant shell-motion controller 20 of backrest 16B includes first and second shell mounts 21, 22 as suggested in FIGS. 3 and 5. For example, a first shell mount 21 comprising several free-pivoting links 24 is coupled to deformable seat shell 18 and to a stationary first link foundation 261 and oriented to change the shape of the deformable seat shell 18 during a shift in position of a person sitting in vehicle seat 10 relative to a pan-support frame 16 associated with upright variable-shape seat pan (backrest)) 16B under various loads applied to seat shell 18 by the seated person as suggested in FIGS. 8A, 9A, and 10A to enhance the comfort of the seated person. Second shell mount 22 has a similar structure to first shell mount 21 as suggested in FIG. 6.

Deformable seat shell 18 changes shape in response to any shift in torso position by a person seated on seat bottom 14 to cause rearwardly directed variable forces generated by the position-changing person to be applied to deformable seat shell 18 from top to bottom as suggested in FIGS. 19-21. Deformable seat shell 18 includes a lower (lumbar-support) shell portion 18L and an upper (shoulder-support) shell portion 18U as suggested in FIG. 1.

Compliant shell-motion controller 20 is mounted in a stationary position relative to seat foundation 12 so as to allow free-pivoting movement of several free-pivoting links 24 included in compliant shell-motion controller 20 and oriented to lie in certain selected positions relative to deformable seat shell 18 and to one another. Such free-pivoting movement of free-pivoting links 24 functions to control motion of deformable seat shell 18 relative to seat foundation 12 in response to forces applied by the torso of a person seated on seat bottom 14 as that person shifts position in vehicle seat 10 as suggested in FIGS. 8A-10A.

In illustrative embodiments, a stationary first link foundation 261 included in first shell mount 21 of compliant shell-motion controller 20 is coupled to lie in a stationary position on a pan-support frame 16F included in seat back 16. Each of free-pivoting links 24 included in first shell mount 21 is coupled at an inner end thereof to first link foundation 261 and at an outer end thereof to deformable seat shell 18 as suggested in FIGS. 6 and 7.

Seat back 16 includes upright variable-shape seat pan (backrest) 16B, a headrest 16H arranged to extend upwardly from backrest 16B, and a pan-support frame 16F arranged to extend upwardly from seat foundation 12 and lie behind backrest 16B as suggested in FIGS. 1-3. Backrest 16B provides a compliant shell system that is coupled to pan-support frame 16F to allow occupant-controlled deformable seat shell 18 to move relative to pan-support frame 16F and change shape in response to forces applied to seat shell 18 by a position-changing person 11 seated on seat bottom 14.

Seat back 16 also includes a seat cover 16C and frame shield 16S in illustrative embodiments as suggested in FIG. 3. Seat cover 16C is adapted to cover a front face of deformable seat shell 18 and include an outer trim cover 98 and an inner pad 100 interposed between outer trim cover 98 and deformable seat shell 18 as suggested in FIGS. 2 and 3. Frame shield 16S is adapted to be mounted on a rear face of pan-support frame 16F to trap pan-support frame 16F between upright variable-shape seat pan (backrest) 16B and frame shield 16S as suggested in FIGS. 3 and 6. In an illustrative embodiment, headrest 16H includes a base 16HB coupled to an upper portion of pan-support frame 16F and a pad 16HP coupled to frame shield 16S and mounted on an exposed portion of base 16HB as suggested in FIGS. 3, 6, and 7.

Upright variable-shape seat pan (backrest) 16B of seat back 16 includes an occupant-controlled deformable seat shell 18 and a compliant shell-motion controller 20. In illustrative embodiments, compliant shell-motion controller 20 includes a first shell mount 21 and a second shell mount 22 as suggested in FIGS. 5 and 6. Each of shell mounts 21, 22 includes a series of free-pivoting links 24 arranged to lie between deformable seat shell 18 and a portion 61 or 62 of pan-support frame 16F of seat back 16 as suggested in FIG. 6. Shell mounts 21 and 22 cooperate to provide means for supporting deformable seat shell 18 during deformation of seat shell 18 caused by shifting torso movement of a seated person and for coupling deformable seat shell 18 to pan-support frame 16F. As shown in FIGS. 5 and 6, second shell mount 22 is arranged to lie in laterally spaced-apart relation to first shell mount 21 so that deformable seat shell 18 extends between and interconnects shell mounts 21, 22 of compliant shell-motion controller 20. In an illustrative embodiment, first shell mount 21 is coupled to forwardly facing surface 61 on pan-support frame 16F and second shell mount 22 is coupled to forwardly facing surface 62 on pan-support frame 16F as suggested in FIGS. 3 and 6.

Links 24 in each of shell mounts 21, 22 will move relative to one another as suggested in FIGS. 8A-10A in response to rearward forces applied to a forward-facing surface of deformable seat shell 18 by a seated person. The shape of deformable seat shell 18 is controlled by selecting the length, pivot points, orientation, and relative spacing of the links 24 in each shell mount 21, 22 at the seat-shell design stage. A two-sided system comprising laterally spaced-apart shell mounts 21, 22 (each shell mount including a series of free-pivoting links 24) coupled to left and right sides of deformable seat shell 18 allows the compliant shell provided by upright variable-shape seat pan (backrest) 16B in accordance with the present disclosure to be installed on a traditional vehicle seat foundation with no changes to a traditional vehicle seat architecture that has been designed to resist and accommodate external impact forces.

Figure 7:
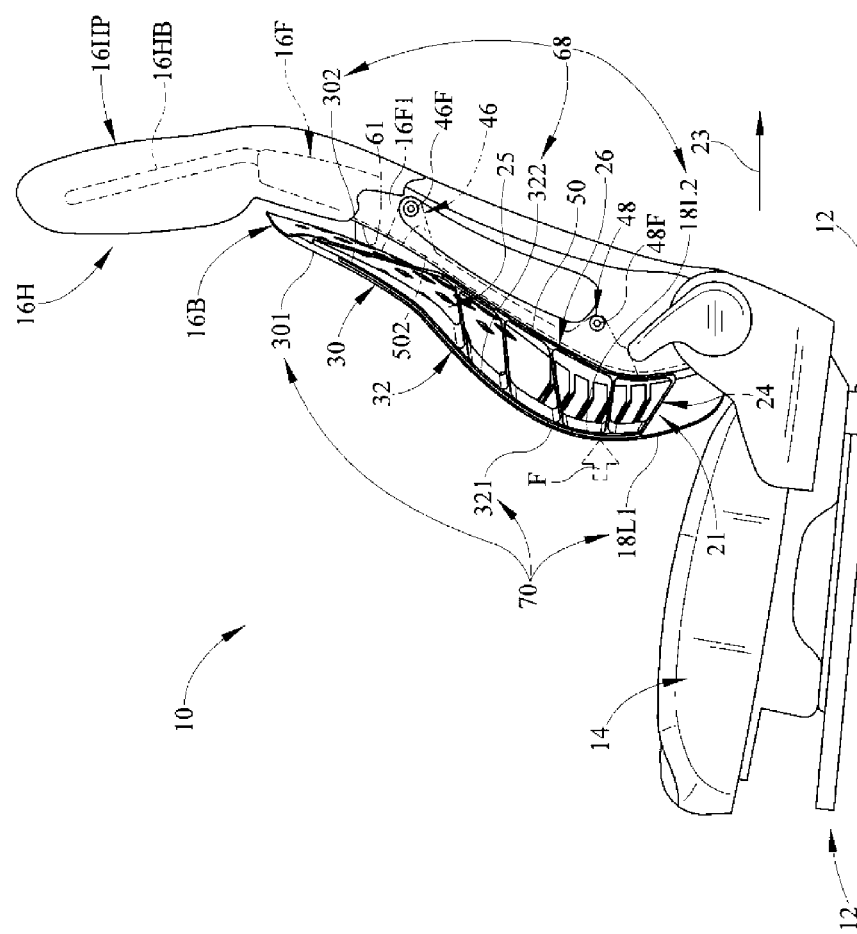
FIG. 7 is a side elevation view of the vehicle seat of FIG. 1 showing that the upright variable-shape seat pan (backrest) includes an occupant-controlled deformable seat shell and a first shell mount comprising a stationary first link foundation (e.g., curved strip) located in spaced-apart relation from the deformable seat shell and mounted on the pan-support frame and a series of six free-pivoting links interconnecting the deformable seat shell and the first link foundation.

First shell mount 21 of compliant shell-motion controller 20 includes a stationary first link foundation 261 and several free-pivoting links 24 lying in spaced-apart relation to one another in selected negatively and positively sloping orientations as suggested in FIGS. 7, 8A, and 8B. First link foundation 261 is an elongated strip coupled to a forwardly facing surface 61 provided on pan-support frame 16F and arranged to face toward deformable seat shell 18 as suggested in FIG. 3. As shown in FIGS. 5-7, links 24 are arranged to lie in a space 25 provided between seat shell 18 and first link foundation 261.

Links 24 in first shell mount 21 cooperate to provide means for supporting deformable seat shell 18 for controlled movement relative to first link foundation 261 in response to a force F applied in a rearward direction 23 to deformable seat shell 18 by a person 11 sitting on seat bottom 14 so that the torso of the person is supported comfortably by deformable seat shell 18 in a matter suited to each person as a function of the orientation of the person's torso relative to seat bottom 14 as shown, for example, in FIGS. 19-21. Links 24 of shell mount 21 along with deformable seat shell 18 cooperate to provide deformable seat shell 18 with a comfortable, customized, and sympathetic shape suited to seated persons 11 of various shapes, sizes, and postures. Stationary first link foundation 261 is coupled to pan-support frame 16F of seat back 16 as suggested in FIGS. 2, 3, and 7 to lie in a fixed position relative to seat foundation 12 and does not move relative to pan-support frame 16F during movement of seat shell 18 relative to pan-support frame 16F as suggested in FIGS. 8A-10A.

One end of each link 24 included in shell mount 21 is coupled to stationary first link foundation 261 and an opposite end of each link 24 is coupled to deformable seat shell 18. In an illustrative embodiment, a first series of six links 24 is included in first shell mount 21 of upright variable-shape seat pan (backrest) 16B as suggested in FIGS. 9A and 9B and this series comprises three bottom links BL1, BL2, and BL3 coupled to lower shell portion 18L of seat shell 18; one top link TL1 coupled to an upper panel 30 of upper shell portion 18U of seat shell 18; and two middle links ML1 and ML2 coupled to a lower panel 32 of upper shell portion 18U of seat shell 18.

Second shell mount 22 of compliant shell-motion controller 20 includes a stationary second link foundation 262 and several free-pivoting links 24 lying in spaced-apart relation to one another in selected negatively and positively sloping orientations as suggested in FIGS. 5 and 6. Link foundation 262 is an elongated strip coupled to a forwardly facing surface 62 provided on pan-support frame 16F and arranged to face toward deformable seat shell 18 as suggested in FIG. 3. As shown in FIGS. 5 and 6, links 24 are arranged to lie in a space 25 provided between seat shell 18 and second link foundation 262.

Links 24 cooperate to provide means for supporting deformable seat shell 18 for controlled movement relative to second link foundation 262 in response to a force F applied in a rearward direction 23 to deformable seat shell 18 by a person 11 sitting on seat bottom 14 so that the torso of the person is supported comfortably by deformable seat shell 18 in a matter suited to each person as a function of the orientation of the person's torso relative to seat bottom 14 shown in FIGS. 19-21. Links 24 of second shell mount 22 and deformable seat shell 18 cooperate with links 24 of first shell mount 21 to provide seat shell 18 with a comfortable, customized, and sympathetic shape suited to seated persons 11 of various shapes, sizes, and postures. Stationary second link foundation 262 is coupled to pan-support frame 16F of seat back 16 to lie in a fixed position relative to seat foundation 12 and does not move relative to pan-support frame 16F during movement of seat shell 18 relative to pan-support frame 16F. First and second link foundations 261, 262 cooperate to define a shell foundation 26 associated with deformable seat shell 18 and coupled to pan-support frame 16F of seat back 16 as shown, for example, in FIG. 6.

One end of each link 24 included in shell mount 22 is coupled to stationary second link foundation 262 and an opposite end of each link 24 is coupled to seat shell 18. In an illustrative embodiment, a second series of six links 24 is included in second shell mount 22 of upright variable-shape seat pan (backrest) 16B as suggested in FIGS. 9A and 9B and this series comprises three bottom links BL1, BL2, and BL3 coupled to lower shell portion 18L of seat shell 18; one top link TL1 coupled to an upper panel 30 of upper shell portion 18U of seat shell 18; and two middle links ML1 and ML2 coupled to a lower panel 32 of upper shell portion 18U of seat shell 18.

Occupant-controlled deformable seat shell 18 is arranged to extend along the back of a torso of person 11 seated on seat bottom 14 to provide lumbar and other spinal support as shown, for example, in FIGS. 19-21. Deformable seat shell 18 is made of a deformable construction and has a shape that varies in response to forces F1 and F2 provided by person 11 to provide custom spinal column support suited to the needs and commands of each person 11 as the posture of that person in vehicle seat 10 changes as suggested in FIGS. 8A-10A. Deformable seat shell 18 is configured to bend and flex in a designed way to ensure proper pressure distribution and support through a wide range of seated postures. In illustrative embodiments, deformable seat shell 18 is movable relative to stationary shell foundation 26 that is arranged to lie in spaced-apart relation to deformable seat shell 18 as shown, for example, in FIGS. 4 and 5.

As shown in FIGS. 2 and 4, deformable seat shell 18 is defined by a relatively thin pliable contoured sheet made of a pliable plastics material in an illustrative embodiment as suggested in FIGS. 2, 4, and 5. Deformable seat shell 18 includes a lower shell portion 18L and an upper shell portion 18U as suggested in FIG. 4. Lower shell portion 18L is arranged to lie between seat bottom 14 and upper shell portion 18U as suggested in FIG. 1. Upper shell portion 18U is arranged to lie between lower shell portion 18L and headrest 16H as also suggested in FIG. 1.

Lower shell portion 18L of deformable seat shell 18 is formed to include a series of generally horizontally extending slots 28 as shown, for example, in FIGS. 1-7. Slots 28 are formed to lie in vertically spaced-apart parallel relation to one another. Slots 28 are sized and shaped to facilitate controlled deformation of lower shell portion 18L of deformable seat shell 18 as suggested in FIGS. 8A-10A. Lower shell portion 18L is configured to have a forwardly facing convex surface 18L1 that is arranged to face toward the person and a rearwardly facing concave surface 18L2 that is arranged to face toward first and second link foundations 261, 262 of shell foundation 26 as suggested in FIG. 5.

Upper shell portion 18U includes an upper panel 30 and a lower panel 32 as shown in FIG. 4. Upper panel 30 is spaced-apart from lower shell portion 18L and is arranged to locate lower panel 32 between upper panel 30 and lower shell portion 18L. As shown in FIG. 7, upper panel 30 is configured to have a forwardly facing concave surface 301 that is arranged to face toward the person seated on seat bottom 14. An opposite rearwardly facing convex surface 302 is arranged to face toward shell foundation 26 as shown in FIG. 7. Lower panel 32 of upper shell portion 18U is configured to have a forwardly facing surface 321 and a rearwardly facing surface 322. Forwardly facing surface 321 of lower panel 32 transitions smoothly between forwardly facing concave surface 301 and forwardly facing convex surface 18L1. Rearwardly facing surface 302 of lower panel 32 transitions smoothly between rearwardly facing convex surface 302 and rearwardly facing concave surface 18L2. Together, rearwardly facing surfaces 302, 322, and 18L2 cooperate to define a rearwardly facing shell surface 68 as shown in FIG. 7. Forwardly facing surfaces 301, 321, and 18L1 cooperate to define a forwardly facing shell surface 70.

Compliant shell-motion controller 20 is configured to provide means attached to an automotive seat structure for controlling the shape of a comfort shell defined by deformable seat shell 18. Compliant shell-motion controller 20 includes free-pivoting links 24 having a deformable plastic geometry engineered to flex in a prescribed way. Deformable seat shell 18 and compliant shell-motion controller 20 are, in an illustrative embodiment, molded in one piece using two types of polypropylene plastics material in a two-shot injection molding process. As an example, the first type of polypropylene is about 20 percent glass-filled polypropylene and is used in the deformable seat shell 18 and the shell foundation 26. The second type of polypropylene includes EPDM rubber and is used in the free-pivoting links 24.

When pressure is applied to the lower region (e.g., lower shell portion 18L) of deformable seat shell 18 by slouching, this causes the upper region (e.g., upper shell portion 18U) of deformable seat shell 18 to move forward following the seated person's shoulders. The end result is good contact to the person's entire back creating better pressure distribution. In illustrative embodiments, the design of compliant shell-motion controller 20 is very specific to ensure the proper amount of lumbar flattening coordinated with the proper amount of upper back movement. The uppermost links TL1, ML2 cooperate to create a virtual pivot point VPP for the upper back which rotates in a way sympathetic to the person's body. The number of flexing links 24 used in each shell mount 21 or 22 can vary, but in an illustrative embodiment at least four or five are used. More links can be added for aesthetic purposes, but as more links are added, they are made thinner in cross section. In illustrative embodiments, each set of links 24 is aligned with a portion 61 or 62 of pan-support frame 16F to ensure that loads applied to deformable seat shell 18 are transferred to pan-support frame 16F of seat back 16.

Complexity of assembly is minimized as upright variable-shape seat pan (backrest) 16B is fastened as a unit to pan-support frame 16F using fasteners. This design is a modular system well suited for use on many support frames included in seat backs of vehicle seats.

As illustrated in FIG. 5, deformable seat shell 18 is coupled to pan-support frame 16F by the separated first and second shell mounts 21, 22 included in compliant shell-motion controller 20. First shell mount 21 includes a first series of links 24 coupled to a first stationary link foundation 261. Second shell mount 22 includes a second series of links 24 coupled to a second stationary link foundation 262. First shell mount 21 is substantially the same as second shell mount 22, and thus, only first shell mount 21 will be discussed in detail. First series of six links 24 illustratively includes first bottom link BL1, second bottom link BL2, third bottom link BL3, first middle link ML1, second middle link ML2, and top link TL1 as shown in FIGS. 8A-10A. Links BL1, BL2, BL3, ML1, ML2, and TL1 cooperate to control shape-changing movement of upper shell portion 18U and lower shell portion 18L in response to application of forces F1, F2 by person 11 sitting on seat bottom 14.

Bottom links BL1, BL2, and BL3 are arranged to extend between and interconnect lower shell portion 18L to stationary link foundation 261 as shown in FIG. 7. Middle links ML1 and ML2 are arranged to extend between and interconnect lower panel 32 of upper shell portion 18U to stationary link foundation 261. Top link TL1 is arranged to extend between and interconnect upper panel 30 of upper shell portion 18U to stationary link foundation 261. Links BL1, BL2, BL3, ML1, ML2, and TL1 are arranged to cause deformable seat shell 18 to move predictably from an initial (lordosis) seat-shell shape shown in FIG. 8A to a transition (mid-range) seat-shell shape shown in FIG. 9A in response to first force F1 and to final (kyphosis) seat-shell shape shown in FIG. 10A in response to second force F2.

As shown in FIG. 8B, deformable seat shell 18 is in the initial position and links BL1, BL2, BL3, ML1, ML2, and TL1 are in initial orientations relative to a set of horizontal references lines H1, H2, H3, H4, H5 and H6 that are generally horizontal. As illustrated in FIG. 8B, first bottom link BL1 slopes in a downhill (negative) direction from inner concave surface 18L2 toward stationary link foundation 261. First bottom link BL1 defines an initial first bottom-link angle BA1$i$ that is included between first bottom link BL1 and horizontal reference line H1. As an example, initial first bottom-link angle BA1$i$ is about 150 degrees. Second bottom link BL2 slopes in the downhill direction from inner concave surface 18L2 toward stationary link foundation 261. Second bottom link BL2 defines an initial second bottom-link angle BA2$i$ of about 173 degrees. Third bottom link BL3 slopes in an uphill (positive) direction from inner concave surface 18L2 toward stationary link foundation 261. Third bottom link BL3 defines an initial third bottom-link angle BA3$i$ of about 188 degrees as shown in FIG. 8B. First middle link ML1 slopes in the uphill direction from lower panel 32 of upper shell portion 18U toward stationary link foundation 261. First middle link ML1 defines an initial first middle-link angle MA1$i$ of about 187 degrees. Second middle link ML2 slopes in the uphill direction from lower panel 32 of upper shell portion 18U toward stationary link foundation 261. Second middle link ML2 defines an initial second middle-link angle MA2$i$ of about 183 degrees. First top link TL1 slopes in the uphill direction from upper panel 30 of upper shell portion 18U toward link foundation 261. First top link TL1 defines an initial first top-link angle of about 71 degrees.

Deformable seat shell 18 moves from the initial (lordosis) seat-shell shape to the transition (mid-range) seat-shell shape in response to application of first force F1 to the lower shell portion 18L as shown in FIG. 9B. As an example, first bottom link BL1 remains sloping in the downhill (negative) direction and defines a transitional first bottom-link angle BA1$t$ of about 165 degrees. Second bottom link BL2 slopes in the uphill (positive) direction and defines a transitional second bottom-link angle BA2$t$ of about 190 degrees. Third bottom link BL3 slopes in an uphill direction and defines a transitional third bottom-link angle BA3$t$ of about 190 degrees as shown in FIG. 9B. First middle link ML1 slopes in the uphill direction and defines a transitional first middle-link angle MA1$t$ of about 188 degrees. Second middle link ML2 slopes in the uphill direction and defines a transitional second middle-link angle MA2$t$ of about 188 degrees. First top link TL1 slopes in the uphill direction and defines a transitional first top-link angle TA1$i$ of about 71 degrees.

Deformable seat shell 18 moves illustratively from the transition (mid-range) seat-shell shape to the final (kyphosis) seat-shell shape in response to application of second force F2 to the lower shell portion 18L as illustrated, for example, in FIG. 10B. First bottom link BL1 slopes in the uphill (positive) direction and defines a final first bottom-link angle BA1$f$ of about 193 degrees. Second bottom link BL2 slopes in the uphill direction and defines a final second bottom-link angle BA2$f$ of about 204 degrees. Third bottom link BL3 slopes in an uphill direction and defines a final third bottom-link angle BA3$f$ of about 205 degrees as shown in FIG. 10B. First middle link ML1 slopes in the uphill direction and defines a final first middle-link angle MA1$f$ of about 202 degrees. Second middle link ML2 slopes in the uphill direction and defines a final second middle-link angle MA2$f$ of about 199 degrees. First top link TL1 slopes in the uphill direction and defines a final first top-link angle TA1$f$ of about 81 degrees.

Each of links BL1, BL2, BL3, ML1, ML2, and TL1 includes a shell end and an opposite foundation end. The shell end is appended to the deformable seat shell 18 and the foundation end is appended to the stationary shell foundation 26. The foundation end of links BL1, BL2, BL3, ML1, ML2 and TL1 is fixed in position relative to support frame 16F during movement of deformable seat shell 18. As an example, first series of links BL1, BL2, BL3, ML1, ML2, and TL1, and link foundation 261 are formed together to be monolithic. Deformable seat shell 18 moves relative to link foundation 261 as a result of links BL1, BL2, BL3, ML1, ML2, and TL1 bending relative to seat shell 18 and link foundation 261.

As shown in FIG. 5, link foundation 261 interconnects seat shell 18 and series 41 of links BL1, BL2, BL3, ML1, ML2, and TL1 to support frame 16F. Link foundation 261 includes a first anchor mount 46, a second anchor mount 48, and a link-anchor strip 50. First anchor mount 46 is spaced-apart above second anchor mount 48. Link-anchor strip 50 is appended to mounts 46 and 48 and extends therebetween. Link-anchor strip 50 also extends in an upward direction to mate with the top link TL1 as shown in FIG. 7 and extends in a downward direction to mate with first bottom link BL1 as shown in FIGS. 4 and 5. Mounts 46 and 48 are coupled to pan-support frame 16F illustratively by a pair of associated fasteners 46F and 48F as suggested in FIG. 7.

Link-anchor strip 50 includes a front surface 501 and a rear surface 502 as shown in FIGS. 4 and 5. Front surface 501 is arranged to face toward seat shell 18 and series 41 of links BL1, BL2, BL3, ML1, ML2, and TL1 are appended to front surface 501. Rear surface 502 is arranged to face toward and mate with pan-support frame 16F as suggested in FIG. 3. First and second anchor mounts 46 and 48 are appended to rear surface 502 as shown in FIG. 5.

Link-anchor strip 50 further includes a bottom segment 50B, a middle segment 50M, and a top segment 50T as shown in FIGS. 8A-10A. Top segment 50T is spaced-apart from bottom segment 50B and arranged to locate middle segment 50M therebetween. As illustrated in FIGS. 8A-10A, bottom links BL1, BL2, and BL3 are appended to bottom segment 50B of link-anchor strip 50. Middle links ML1, ML2 are appended to middle segment 50M. Top link TL1 is appended to top segment 50T. As an example, first anchor mount 46 is appended to top segment 50T and middle segment 50M at an interface where top and middle segments 50T and 50M mate with one another. Second anchor mount 48 is appended to bottom segment 50B as suggested in FIG. 7.

As shown in FIGS. 1 and 3, pan-support frame 16F is a rigid unit coupled to seat foundation 12. Pan-support frame 16F includes a first upright mount pillar 16F1, a second upright mount pillar 16F2, and a headrest mount 16F3 as shown in FIG. 3. First upright mount pillar 16F1 is coupled to seat foundation 12 and arranged to extend upwardly therefrom. Second upright mount pillar 16F2 is coupled to seat foundation 12 and is spaced-apart laterally from first upright mount pillar 16F1. Second upright mount pillar 16F2 is arranged to extend upwardly parallel to first upright mount pillar 16F1 as shown in FIG. 3. Headrest mount 16F3 is positioned to lie in spaced-apart relation above seat foundation 12 and is arranged to extend between and interconnect first and second mount pillars 16F1, 16F2. Together, first and second mount pillars 16F1, 16F2, headrest mount 16F3, and seat foundation 12 cooperate to form a central aperture 58 as suggested in FIG. 3.

First mount pillar 16F1 includes a mount surface 61 that is arranged to face toward first stationary link foundation 261. Second mount pillar 16F2 includes a mount surface 62 that is arranged to face toward second stationary link foundation 262. During assembly of seat back 16, rear surface 501 of link-anchor strip 50 included in first link foundation 261 lies in confronting relation and mates with mount surface 61 of first mount pillar 16F1 as shown in FIG. 7. Rear surface 501 of link-anchor strip 50 included in second link foundation 262 lies in confronting relation and mates with mount surface 62 of second mount pillar 16F2.

Frame shield 16S is configured to mount on and cover a rear side of pan-support frame 16F as suggested in FIG. 3. Frame shield 16S includes a ring-shaped shield 60 formed to include a central aperture 64 and a ring-shaped wall 66 coupled to ring-shaped shield 60 along an interior perimeter edge thereof defining central aperture 64. Rearwardly facing surface 68 of seat shell 18 will be visible through central apertures 58 and 64 as suggested in FIG. 4 when seat back 16 is assembled. It is within the scope of this disclosure to install a panel (not shown) in central aperture 64 to close that aperture for aesthetic reasons if desired. It is also within the scope of the present disclosure to mount a map pocket or a floating mesh pocket in central aperture 64 so as to be accessible to a person seated in a seat (not shown) located behind vehicle seat 10.

Figure 11:
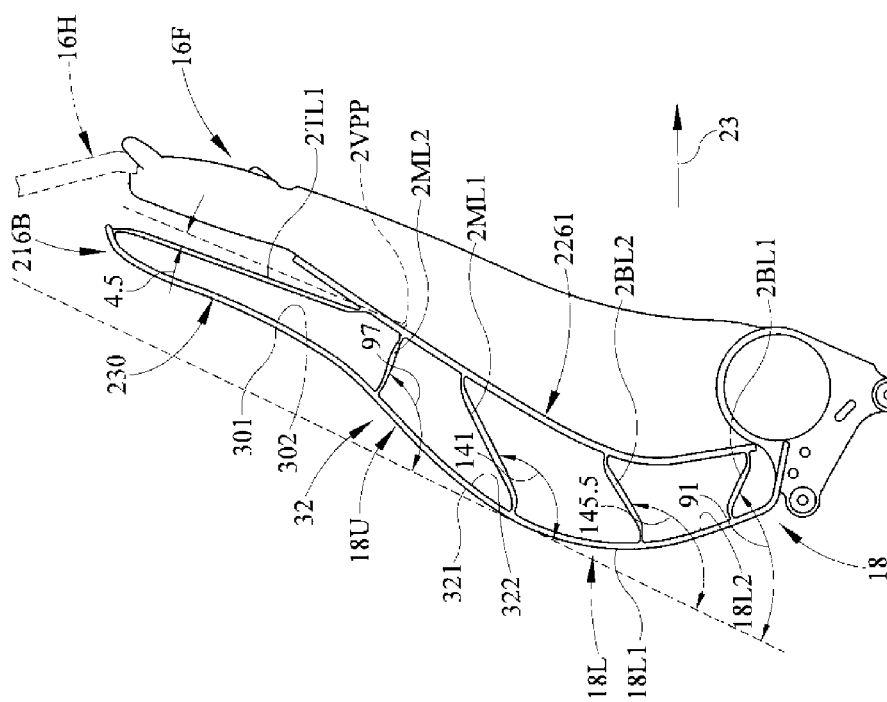
FIG. 11 is an elevation view of another embodiment of a seat back providing an occupant-support base in accordance with the present disclosure showing that an upright variable-shape seat pan (backrest) included in that seat back comprises an occupant-controlled deformable seat shell and a first shell mount comprising a stationary first link foundation (e.g., curved strip) and a first series of five flexible links interconnecting the deformable seat shell and the first link foundation.

Another embodiment of a seat back 216 in accordance with the present disclosure is illustrated in FIGS. 11-14. Seat back 216 includes an upright variable-shape seat pan (backrest) 216B, headrest 16H, and pan-support frame 16F. Backrest 216B includes an occupant-controlled deformable seat shell 18, a first shell mount 221, and a second shell mount (not shown). Shell mount 221 includes a series of five deformable links 224 and a stationary link foundation 2261 as shown in FIG. 11. Stationary link foundation 2261 interconnects links 224 and seat shell 18 to pan-support frame 16F as suggested in FIG. 11. Links 224 interconnect seat shell 18 to stationary link foundation 2261 and supports deformable seat shell 18 for movement relative to stationary link foundation 2261 in response to a force applied in a rearward direction 23 to deformable seat shell 218 by a seated person sitting on seat bottom 14 so that a back of the person is supported by deformable seat shell 18 as suggested in FIGS. 12-14.

As an example, link 224 includes a first series of links and a second series of links (not shown). First series of links 224 illustratively includes a first bottom link 2BL1, a second bottom link 2BL2, a first middle link 2ML1, a second middle link 2ML2, and a top link 2TL1 as shown in FIGS. 11-14. Links 2BL1, 2BL2, 2ML1, 2ML2, and 2TL1 cooperate together to coordinate movement of an upper shell portion 18U and a lower shell portion 18L relative to stationary link foundation 2261 in response to application of forces F1, F2 by a person sitting on seat bottom 14.

Bottom links 2BL1 and 2BL2 are arranged to extend between and interconnect lower shell portion 218L to stationary link foundation 2261 as shown in FIG. 11. Middle links 2ML1 and 2ML2 are arranged to extend between and interconnect lower panel 232 of upper shell portion 218U to stationary link foundation 2261. Top link 2TL1 is arranged to extend between and interconnect upper panel 230 of upper shell portion 218U to stationary link foundation 2261. Links BL1, BL2, ML1, ML2, and TL1 are arranged to cause deformable seat shell 18 to move predictably from an initial seat-shell shape shown in FIG. 8A to a transition seat-shell shape shown in FIG. 9A in response to a first force F1 and to a final seat-shell shape shown in FIG. 10A in response to a second force F2.

As shown in FIG. 11, deformable seat shell 218 is in the initial (lordosis) seat-shell shape and links 2BL1, 2BL2, 2ML1, 2ML2, and 2TL1 are in initial orientations relative to a reference line 102. In this coordinate system, first bottom link 2BL1 defines an initial first bottom-link angle 91 of about 91 degrees as shown in FIG. 11. Second bottom link 2BL2 defines an initial second bottom-link angle 145.5 of about 145.5 degrees. First middle link 2ML1 defines an initial first middle-link angle 141 of about 141 degrees. Second middle link 2ML2 defines an initial second middle-link angle 97 of about 97 degrees. First top link 2TL1 defines an initial first top-link angle 4.5 of about 4.5 degrees relative to a second reference line 104 that is spaced-apart from and parallel to reference line 102.

As shown in FIG. 12, deformable seat shell 218 remains in the initial seat-shell shape and links 2BL1, 2BL2, 2ML1, 2ML2, and 2TL1 are in initial orientations relative to horizontal references lines H1, H2, H3, H4, and H5 that are generally horizontal. In this coordinate system, first bottom link 2BL1 slopes in a downhill (negative) direction and defines an initial first bottom-link angle 2BA1$i$ of about 175 degrees relative to the horizontal. Second bottom link 2BL2 slopes in the uphill (positive) direction and defines an initial second bottom-link angle 2BA2$i$ of about 185 degrees. First middle link 2ML1 slopes in the uphill direction and defines an initial first middle-link angle 2MA1$i$ of about 196 degrees. Second middle link 2ML2 slopes in the downhill direction and defines an initial second middle-link angle 2MA2$i$ of about 148 degrees. First top link 2TL1 slopes in the uphill direction and defines an initial first top-link angle 2TA1$i$ of about 78 degrees.

Deformable seat shell 218 moves from the initial (lordosis) seat-shell shape to the transition (mid-range) seat-shell shape in response to application of first force F1 to the lower shell portion 218L as shown in FIG. 13. As an example, first bottom link 2BL1 slopes in the uphill direction and defines a transitional first bottom-link angle 2BA1$t$ of about 203 degrees relative to the horizontal. Second bottom link 2BL2 slopes in the uphill direction and defines a transitional second bottom-link angle 2BA2$t$ of about 210 degrees. First middle link 2ML1 slopes in the uphill direction and defines a transitional first middle-link angle 2MA1$t$ of about 207 degrees. Second middle link 2ML2 slopes in the downhill direction and defines a transitional second middle-link angle 2MA2$t$ of about 162 degrees. First top link 2TL1 slopes in the downhill direction and defines a transitional first top-link angle 2TA1$t$ of about 94.6 degrees.

Deformable seat shell 218 moves illustratively from the transition (mid-range) seat-shell shape to the final (kyphosis) seat-shell shape in response to application of second force F2 to the lower shell portion 218L as illustrated, for example, in FIG. 14. First bottom link 2BL1 slopes in the uphill direction and defines a final first bottom-link angle 2BA1$f$ of about 217 degrees relative to the horizontal. Second bottom link 2BL2 slopes in the uphill direction and defines a final second bottom-link angle 2BA2$f$ of about 228 degrees. First middle link 2ML1 slopes in the uphill direction and defines a final first middle-link angle 2MA1$f$ of about 216 degrees. Second middle link 2ML2 slopes in the downhill direction and defines a final second middle-link angle 2MA2f of about 162 degrees. First top link 2TL1 slopes in the downhill direction and defines a final first top-link angle 2TA1f of about 100 degrees.

Each link 2BL1, 2BL2, 2ML1, 2ML2, and 2TL1 includes a shell end and an opposite foundation end. The shell end is appended to the deformable seat shell 218 and the foundation end is appended to stationary link foundation 2261. The foundation end of links 2BL1, 2BL2, 2ML1, 2ML2, and 2TL1 is fixed in position relative to support frame 16F during movement of deformable seat shell 218. As an example, deformable seat shell 218, first series 241 of links 2BL1, 2BL2, 2ML1, 2ML2, and 2TL1, and stationary link foundation 2261 are monolithic. Deformable seat shell 218 moves relative to link foundation 2261 as a result of links 2BL1, 2BL2, 2ML1, 2ML2, and 2TL1 bending relative to seat shell 218 and link foundation 2261.

Another embodiment of a seat back 316 in accordance with the present disclosure is illustrated in FIGS. 11-14. Seat back 316 includes an upright variable-shape seat pan (backrest) 316B, headrest 16H, and pan-support frame 16F. Backrest 316 is coupled to pan-support frame 16F and includes occupant-controlled deformable seat shell 18, a first shell mount 323, and a second shell mount (not shown). First shell mount 323 illustratively includes a series of links 324 and a link foundation 3261 as shown in FIG. 15. Stationary link foundation 3261 interconnects links 324 and seat shell 18 to pan-support frame 16F as suggested in FIG. 15. Links 324 interconnect seat shell 18 to stationary link foundation 3261 and supports deformable seat shell 18 for movement relative to stationary link foundation 3261 in response to a force applied in a rearward direction 23 to deformable seat shell 18 by a person sitting on seat bottom 14 so that a back of the person is supported by deformable seat shell 18 as suggested in FIGS. 15 and 17.

As shown in FIG. 15, deformable seat shell 18 is coupled to pan-support frame 16F by series of links 324 and stationary link foundation 3261 included in shell mount 323. First series of links 224 illustratively includes a first bottom link 3BL1, a second bottom link 3BL2, a third bottom link 3BL3, a first middle link 3ML1, a second middle link 3ML2, and a top link 3TL1 as shown in FIGS. 15-18B. Links 3BL1, 3BL2, 3BL3, 3ML1, 3ML2, and 3TL1 cooperate together to coordinate movement of upper shell portion 18U and lower shell portion 18L in response to application of forces F1, F2 by a person sitting on seat bottom 14 while link foundation 3261 remains stationary.

Figures 17, 18:
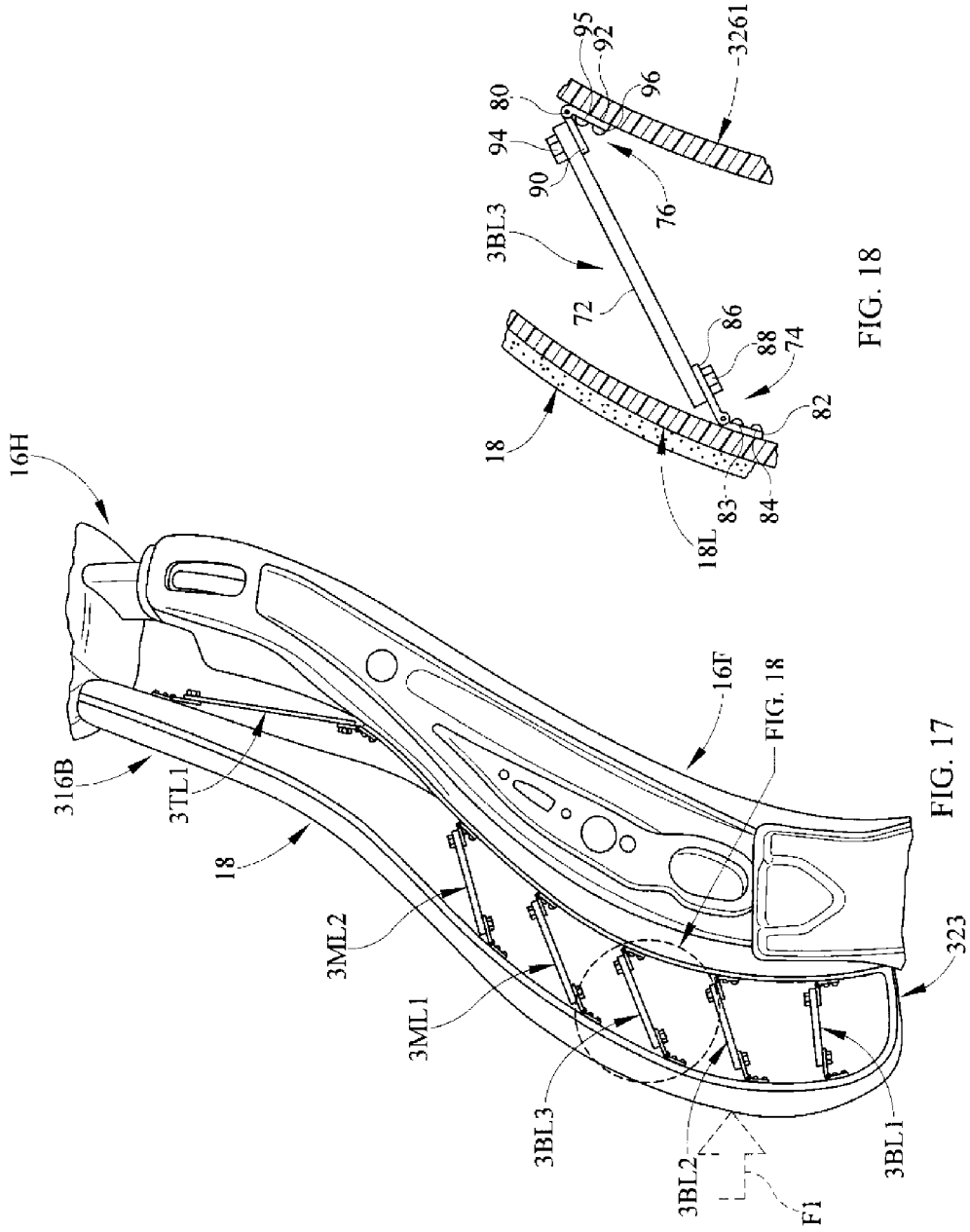
FIG. 17 is a view similar to FIG. 15 showing the deformable seat shell characterized by a final (kyphosis) seat-shell shape.
FIG. 18 is an enlarged elevation view taken from a circled region of FIG. 17 showing the link after the deformable seat shell has been moved to assume the final (kyphosis) seat-shell shape.

Bottom links 3BL1, 3BL2, and 3BL3 are arranged to extend between and interconnect lower shell portion 18L to stationary link foundation 3261 as shown in FIGS. 15 and 16. Middle links 3ML1 and 3ML2 are arranged to extend between and interconnect lower panel 32 of upper shell portion 18U to stationary link foundation 3261. Top link 3TL1 is arranged to extend between and interconnect upper panel 30 of upper shell portion 18U to stationary link foundation 3261. Links 3BL1, 3BL2, 3BL3, 3ML1, 3ML2, and 3TL1 are arranged to cause deformable seat shell 18 to move predictably from an initial seat-shell shape shown in FIG. 15 to a transition seat-shell shape (not shown) in response to first force F1 and to a final seat-shell shape as shown in FIG. 17 in response to second force F2.

Each link 3BL1, 3BL2, 3BL3, 3ML1, 3ML2, and 3TL1 includes a link bar 72, a first hinge 74, and a second hinge 76. As an example, link bar 72 and hinges 74, 76 are substantially rigid so that bending is minimized and only pivoting movement of link bar 72 is obtained. Third bottom link 3BL3 is oriented to slope in a first uphill direction as shown in FIGS. 16A and 16B as a result of seat shell 18 being in the initial position as shown in FIG. 15. Third bottom link 3BL3 slopes in a relatively greater second uphill direction as shown in FIGS. 18A and 18B as a result of seat shell 18 moving to the final position as shown in FIG. 17. Third bottom link 3BL3 moves via pivoting movement about the first and second hinges 74, 76 rather than bending.

As shown, for example, in FIGS. 16A and 16B, third bottom link 3BL3 includes link bar 72, first hinge 74, and second hinge 76. First hinge 74 interconnects link bar 72 to lower shell portion 18L to cause link bar 72 to pivot about a hinge pin 78 included in first hinge 74. Second hinge 76 interconnects link bar 72 to stationary link foundation 3261 to cause link bar 72 and seat shell 18 to pivot about a hinge pin 80 included in second hinge 76. Second hinge 76 may also be coupled to pan-support frame 16F without use of link foundation 3261.

As an example, first hinge 74 includes a seat-shell wing 82, hinge pin 78, and a link-bar wing 86 as shown in FIG. 16B. Seat-shell wing 82 is coupled to deformable seat shell 18 by a pair of fasteners 83, 84. Link-bar wing 86 is coupled to a first end of link bar 72 by a fastener 88. Seat-shell wing 82 is coupled to link-bar wing 86 by hinge pin 78 extending through mating knuckles (not shown) included in each wing 82, 86. Hinge pin 78 defines a first pivot axis about which link bar 72 may move relative to seat shell 18.

As illustrated in FIGS. 18A and 18B, link bar 72 has pivoted about hinge pin 78 of the first hinge 74 and about hinge pin 80 of second hinge 76. Second hinge 76, as an example, illustratively includes a link-bar wing 90, a link-foundation wing 92, and hinge pin 80. Link-bar wing 90 is coupled to an opposite second end of link bar 72 by a fastener 94. Link-foundation wing 92 is coupled to stationary link foundation 3261 by a pair of fasteners 95, 96. Link-bar wing 90 is coupled to link-foundation wing 92 by hinge pin 80 extending through mating knuckles (not shown) included in each wing 90, 92. As an example, hinge pin 80 defines a second pivot axis about which link bar 72 may move relative to link foundation 261.

In accordance with the present disclosure, a shape of occupant-controlled deformable seat shell 18 is called a comfort shell 18 and a compliant shell 18, is controlled by links 24, 224, and 324. Links 24, 224, and 324 are also called compliant mechanisms. Compliant mechanisms 24, 224 include monolithic deformable geometry made from a plastics material that is configured to flex in a prescribed manner in response to external forces. Compliant mechanisms 24, 224 and occupant-controlled deformable seat shell 18 may be molded in one piece using two types of plastics materials. As an example, the first type of polypropylene is a glass-filled polypropylene. The second type of polypropylene includes EPDM rubber.

As an example of use, pressure is applied to lower shell portion 18L by a person slouching while sitting on seat bottom 14 to cause upper shell portion 18U to move away from support frame 16F toward the person following the person's shoulders. As a result, contact with the person's entire back is maximized and maximized pressure distribution on deformable seat shell 18 is produced. Compliant mechanisms 24, 224 are configured to provide coordinated movement of lower shell portion 18L toward pan-support frame 16F (lumbar flattening) and of upper shell portion 18U away from pan-support frame 16F.

As suggested in FIGS. 9A-10B and 12-13, a distance between deformable seat shell 18 and shell foundation 26, 226 is measured perpendicularly from stationary shell foundation 26, 226 and varies continuously along a height of backrest 16B, 216B. During movement of backrest 16B, 216B from the initial position to the transition position and the final position, the distance between seat shell 18 and stationary shell foundation 26, 226 also changes continuously and does not remain substantially constant at any point along the height of backrest 16B, 216B.

As illustrated in FIGS. 9A, top link TL1 and second middle link ML2 cooperate to define virtual pivot point VPP about which upper shell portion 18U rotates in a way that is sympathetic to the body. As illustrated in FIG. 11, top link 2TL1 and second middle link 2ML2 cooperate to define a virtual pivot point 2VPP about which upper shell portion 218U rotates in a way that is sympathetic to the body. Virtual pivot points VPP and 2VPP are positioned to lie behind the deformable seat shell 18.

In one embodiment, first series 41 of links BL1, BL2, BL3, ML1, ML2, and TL1 includes six links as shown in FIGS. 1-10B. In another embodiment, first series 241 of links BL1, BL2, ML1, ML2, and TL1 includes five links. As another example, a series of links may include only four links. Additional links beyond six may be included to maximize visual appeal, but the force required to predictably deform the seat shell should remain about the same so that maximized comfort is provided to the occupant. As an example, when additional links are added, the thickness of each link may be reduced so that the force provided by each link during deformation is sufficient to maintain occupant comfort.

As discussed previously, shell mounts 21, 22, 221, 222 include first series 41, 241 of links 24, 224 and second series 42, 242 of links. First series 41, 241 is spaced-apart laterally across vehicle seat 10, 210 from second series 42, 242. As an example, first series 41, 241 is aligned in front of first upright mount pillar 16F1 of support frame 16F and second series 42, 242 is aligned in front of second upright mount pillar strip 62 of support frame 16F so that forces developed during a vehicle crash are transferred from seat shell 18, 218 through links 24, 224, and into support frame 16F.

Upright variable-shape seat pan (backrest) 16B may be monolithic. As a result, predictable movement of seat shell 18, 218 is obtained without the use of mechanical or electromechanical actuators. Weight and complexity are thus minimized. In addition, shell foundation 26, 226 is coupled illustratively to pan-support frame 16F using only four fasteners. As a result, manufacturing complexity is minimized. Finally, seat shell 18, 218, links 24, 224, and shell foundation 26, 226 may be used with a pre-existing pan-support frame 16F so as to minimize costs and maximize simplicity during manufacturing and design.

Seat Back (Headrest)

Another embodiment of a seat back 416 in accordance with the present disclosure is illustrated in FIGS. 22 and 23. Seat back 416, an upright variable-shape seat pan (backrest) 416B, a companion pan-support frame 16F, and a headrest 416H. Headrest 416H comprises a compliant head-restraint shuttle 416S coupled to an upper portion of upright variable-shape seat pan (backrest) 416B to move therewith, a base 416HB coupled to an upper portion of pan-support frame 16F, and a shuttle guide 416G.

Shuttle guide 416G is coupled to a forward-facing portion of base 416HB and arranged to extend in forward direction 21 toward compliant head-restraint shuttle 416S as suggested in FIG. 22. Shuttle guide 416G is arranged to engage and guide compliant head-restraint shuttle 416S as shuttle 416S moves between a forwardly displaced position shown in FIG. 22 and a rearwardly displaced position shown in FIG. 23.

Compliant head-restraint shuttle 416S includes a head pad 404, a guide receiver 405, and a compliant member 416M comprising segments 401, 402, and 403 and interconnecting upright variable-shape seat pan (backrest) 416B and head pad 404 as suggested in FIG. 11. In illustrative embodiments, compliant head-restraint shuttle 416S is an elastic, pliable monolithic element made of a plastics material. Also in illustrative embodiments, upright variable-shape seat pan (backrest) 416B and compliant head-restraint shuttle 416S cooperate to form an elastic, pliable monolithic element made of a plastics material.

During application of an external impact to a vehicle including a vehicle seat comprising seat back 416, an occupant of that vehicle seat will move to load a lower (lumbar-support) shell portion 18L of a deformable seat shell 18 included in upright variable-shape seat pan (backrest) 416B. In response to such loading, upper shell portion 18U of deformable seat shell 18 and compliant head-restraint shuttle 416S will move relative to pan-support frame 16F in rearward direction 23 from the forwardly displaced position shown in FIG. 22 to, for example, the rearwardly displaced position shown in FIG. 23. Pan-support frame 416F provides a fixed reaction surface, as the weight of the occupant loads against deformable seat shell 18, deformable free-pivoting links 24 in a compliant shell-motion controller 20 also included in upright variable-shape seat pan (backrest) 416B cooperate to allow compliant movement of deformable seat shell 18 and head-restraint shuttle 416S to support the occupant from pelvis to head during a shift in position and posture of the occupant.

An illustrative total spinal care system in accordance with the present disclosure is shown, for example, in FIGS. 22 and 23. The core benefits of a dynamic backrest support surface are present in which a shift in posture drives motion of deformable seat shell 18 to maintain good pressure distribution on the back of a seated passenger. In addition, the shell motion path will also drive the position of headrest 416H to help with comfort. During an external impact, shell 18 moves headrest 416H to minimize a whiplash situation. It is within the scope of this disclosure to lock shell 18 in a most forward position. For example, an occupant loads a lower lumbar region 18L of shell 18 during a rear impact, and upper portion 18U and compliant head restraint shuttle 416S move forward to support the occupant.

A compliant design for headrest 416H is provided in accordance with the present disclosure. In this configuration, base 16HB (see FIG. 3) of headrest 416H provides a fixed reaction surface. As the weight of the occupant's body loads against shell 18, the free-pivoting links take shell 18 through a range of motion which is first for comfort only and then is a reactive whiplash minimization feature.

Seat Bottom

A vehicle seat 510 includes a foundation 12 adapted to be anchored to a vehicle floor 13, a seat bottom 14 mounted on foundation 12, and a seat back 16 arranged to extend upwardly away from seat bottom 14 as shown, for example, in FIG. 24. Seat bottom 14 provides an occupant-support base that is configured to include compliant features in accordance with the present disclosure to change shape sympathetically as suggested in FIGS. 24-36 in response to movement of a person 18 seated on seat bottom 14 or application of external impact forces to a vehicle carrying vehicle seat 510.

Seat bottom 14 includes a variable-shape seat pan 200 that is arranged to underlie and support a person 18 that is seated on seat bottom 14 as suggested in FIG. 34. Variable-shape seat pan 200 is configured to change shape in response to a shift in position or a change in posture of the seated person 18 from an initial seat-pan shape shown, for example, in FIGS. 29-31 and 35 to a subsequent seat-pan shape shown, for example, in FIGS. 32-34 and 36. The position shift or posture change of the seated person 18 can take place on the initiative of person 18 or in response, for example, to exposure of a vehicle including vehicle seat 510 to an external impact force F.

Figure 26:
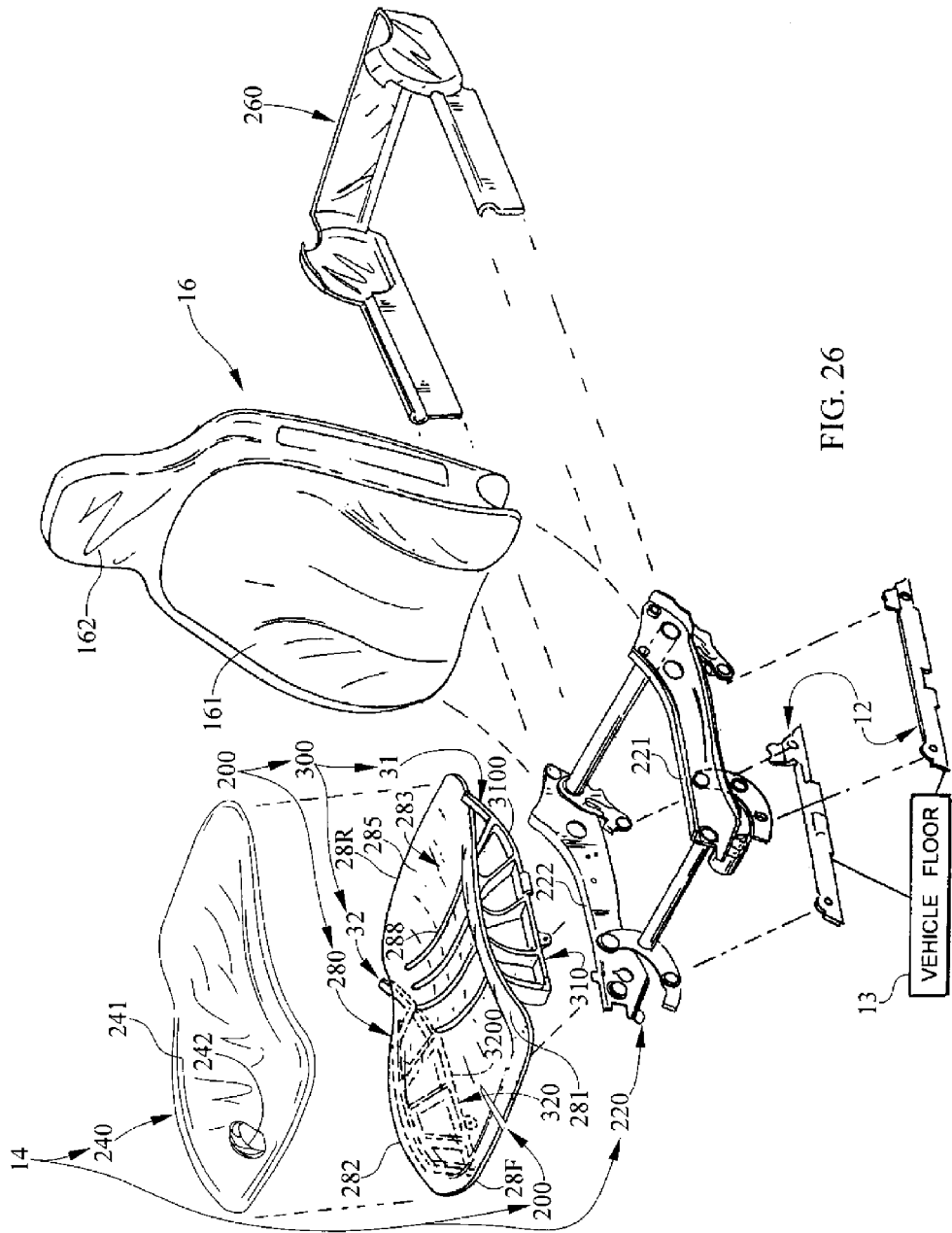
FIG. 26 is an exploded perspective assembly view of illustrative components included in the vehicle seat of FIG. 24 showing that the seat bottom includes a pan-support frame configured to be mounted on an underlying seat foundation comprising two frame-support rails anchored to the vehicle floor, a variable-shape seat pan arranged to overlie the pan-support frame and configured to include a deformable seat shell having several laterally extending slots and a compliant shell-motion controller comprising spaced-apart first and second shell mounts located under the deformable seat shell and adapted to mate with the underlying pan-support frame, and a seat cover configured to mate with and cover an upwardly facing contoured top surface of the deformable seat shell.

Seat bottom 14 further includes a pan-support frame 220, a seat cover 240, and a frame shield 260 in illustrative embodiments as suggested in FIG. 26. Pan-support frame 220 is configured to be mounted on underlying foundation 12 to provide means for supporting variable-shape seat pan 200 above vehicle floor 13 at all times and during a change in shape to variable-shape seat pan 200 as suggested in FIGS. 31 and 34. In illustrative embodiments seat cover 240 is coupled to variable-shape seat pan 200 and frame shield 260 is coupled to pan-support frame 220.

Pan-support frame 220 includes first and second strip-support surfaces 221, 222 as suggested in FIG. 26. In illustrative embodiments, first and second strip-support surfaces 221, 222 face upwardly toward variable-shape seat pan 200 and away from vehicle floor 13 and mate with downwardly facing portions 31, 32 of variable-shape seat pan 200 as suggested in FIGS. 25 and 26 to support variable-shape seat pan 200 on pan-support frame 220. It is within the scope of this disclosure to use any suitable pan-support frame 220 on foundation 12 to support variable-shape seat pan 200 for shape-changing movement relative to vehicle floor 13. It is also within the scope of this disclosure to mount variable-shape seat pan 200 on vehicle floor 13.

Variable-shape seat pan 200 includes a deformable seat shell 280 and a compliant shell-motion controller 300 coupled to deformable seat shell 280 and configured to mate with first and second strip-support surfaces 221, 222 on pan-support frame 220. Deformable seat shell 280 is made of a deformable material and is thus able to change shape from a first seat-shell shape shown, for example, in FIGS. 24-31 and 35 to assume an illustrative second seat-shell shape shown, for example, in FIGS. 32-34 and 36. In illustrative embodiments, deformable seat shell 280 is made of an elastic plastics material. Also in illustrative embodiments compliant shell-motion controller 300 is made of the same deformable elastic plastics material and cooperate with deformable seat shell 280 to form a monolithic variable-shape seat pan 200.

Compliant shell-motion controller 300 comprises first and second shell mounts 31, 32 coupled to deformable seat shell 280 and adapted to mate with, for example, pan-support frame 220 as suggested in FIG. 26. In illustrative embodiments, first shell mount 31 is coupled to a first side portion 281 of deformable seat shell 280 and second shell mount 32 is coupled to an opposite second side portion 282 of deformable seat shell 280 and arranged to lie in spaced-apart relation to first shell mount 31 as suggested in FIGS. 27 and 28. First shell mount 31 is configured to mate with first strip-support surface 221 on pan-support frame 220 and second shell mount 32 is configured to mate with second strip-support surface 222 on pan-support frame 220 as suggested in FIG. 26 to support deformable seat shell 280 for shape-changing movement relative to vehicle floor 13 from a first seat-shell shape shown, for example, in FIGS. 29-31 and 35 to a second seat-shell shape shown, for example, in FIGS. 32-34 and 36.

Figure 27:
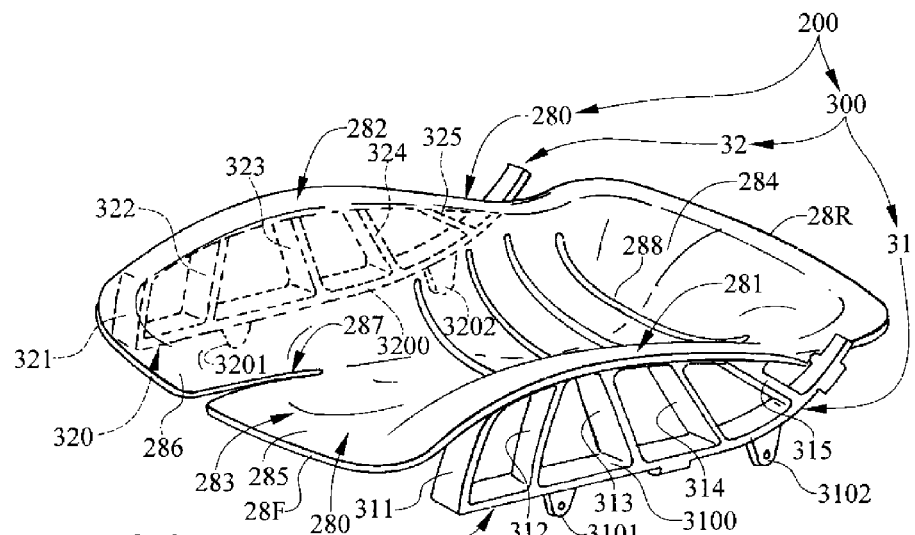
FIG. 27 is an enlarged top perspective view of the illustrative variable-shape seat pan of FIG. 26 showing that each of the first and second shell mounts include (1) a stationary link foundation comprising a link-anchor strip located under one of the side portions of the deformable seat shell and adapted to mate with an underlying strip-support surface included in the pan-support frame and two anchor mounts appended to the link-anchor strip and adapted to be coupled to the pan-support frame and (2) several upwardly extending free-pivoting links of various slopes arranged to interconnect a companion side portion of the deformable seat shell and a companion link-anchor strip and suggesting that the variable-shape seat pan is a monolithic component made of a molded plastics material in an illustrative embodiment.
Figure 28:
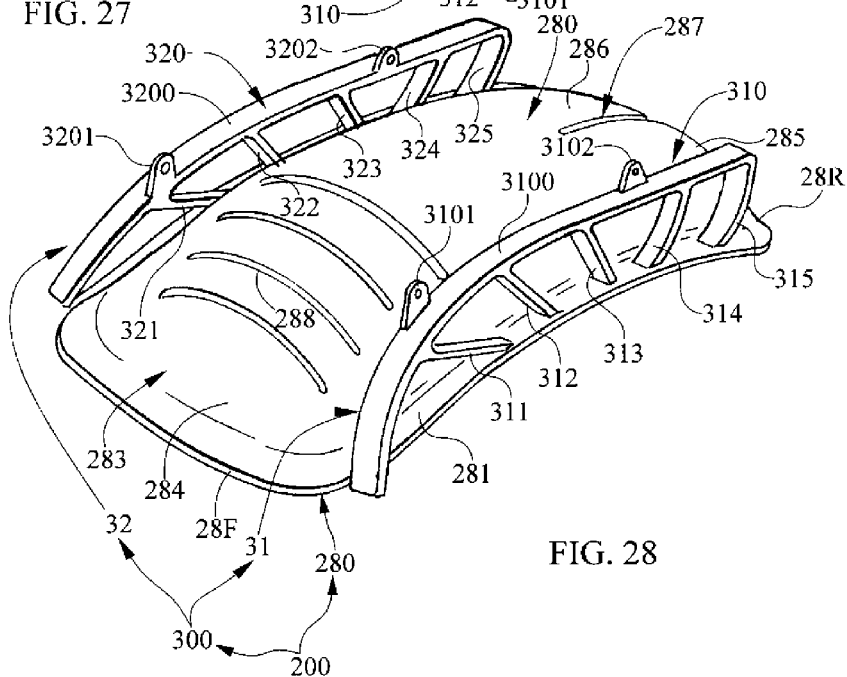
FIG. 28 is a bottom perspective view of the set pan of FIG. 27.

First shell mount 31 includes a stationary link foundation 310 and a series of five free-pivoting links 311-315 in an illustrative embodiment shown in FIG. 28. Stationary link foundation 310 is coupled to and arranged to lie in a stationary position on pan-support frame 22 as suggested in FIGS. 25 and 26. Each of free-pivoting links 311-315 is coupled at one end to stationary link foundation 310 and at an opposite end to first side portion 281 of deformable seat shell 280 as suggested in FIGS. 27 and 28. First shell mount 31 is made of an elastic deformable plastics material in an illustrative embodiment to allow each of free-pivoting links 311-315 to flex and change orientation (i.e., slope), shape, and/or length to support a change in shape of deformable seat shell 28 during exposure of variable-shape seat pan 200 to external forces applied to deformable seat shell 280 by the seated person 18 as such person 18 shifts position or changes posture on seat bottom 14 on the initiative of person 18 or in response to exposure of a vehicle including vehicle seat 510 to an external impact force F as suggested in FIGS. 31 and 35 and FIGS. 32 and 36.

First link foundation 310 includes a first link-anchor strip 3100 and first and second anchor mounts 3101, 3102 coupled to first link-anchor strip 3100 and arranged to lie in spaced-apart relation to one another as suggested in FIGS. 27 and 28. First link-anchor strip 3100 mates with the underlying first strip-support surface 221 included in pan-support frame 220 as suggested in FIGS. 25 and 26. Each of anchor mounts 3101, 3102 is adapted to be coupled to a nearby portion of pan-support frame 220 to hold first link-anchor strip 3100 in mating engagement with first strip-support surface 221.

Figure 35:
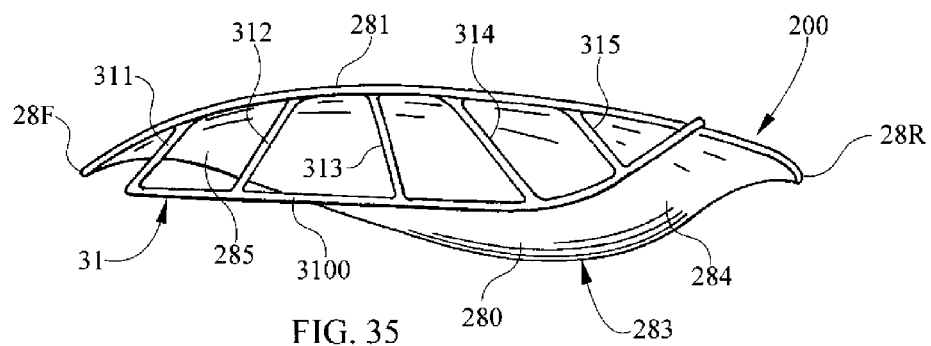
FIG. 35 is an enlarged side elevation view of the deformable seat shell of the variable-shape seat pan in the normal (as-molded) first seat-shell shape.
Figure 36:
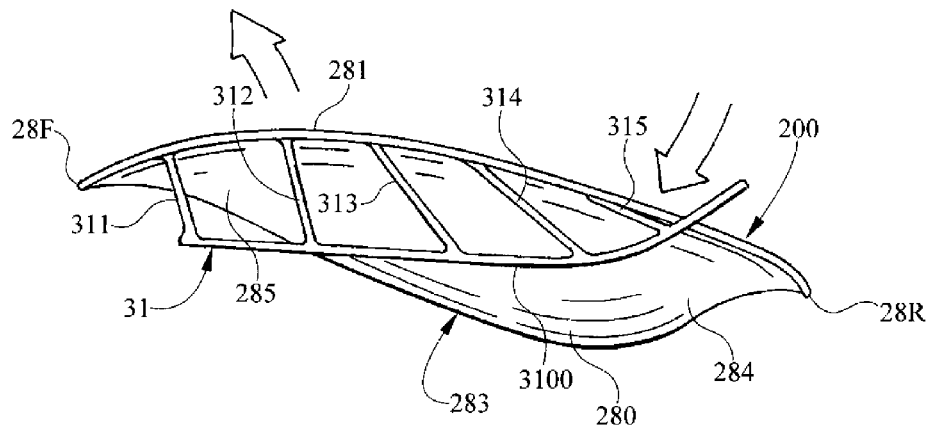
FIG. 36 is a side elevation view similar to FIG. 35 but showing the deformable seat shell of the variable-shape seat pan in the impact-generated second seat-shell shape.

The free-pivoting links 311-315 included in first shell mount 31 cooperate to provide means for yieldably supporting deformable seat shell 280 for controlled movement relative to first link foundation 310 in response to forces applied by the seated person 18 to deformable seat shell 280. In an illustrative embodiment, the initial orientations of free-pivoting links 311-315 are shown in FIGS. 31 and 35 to support deformable seat shell 280 in a first seat-shell shape. For example, relative to the underlying link-anchor strip 3100, first free-pivoting link 311 has a positive slope, second free-pivoting link 312 has a relatively steeper positive slope, third free-pivoting link 313 has a negative slope, fourth free-pivoting link 314 has a relatively less steep negative slope, and fifth free-pivoting link 315 has an even less-steep negative slope as shown in FIG. 35. In contrast, the final orientations of free-pivoting links 311-315 are shown in FIG. 36 after deformable seat shell 280 has been moved to assume a second seat-shell shape in an illustrative manner suggested in FIG. 34. For example, relative to the underlying link-anchor strip 3100, first free-pivoting link 311 now has a negative slope, second free-pivoting link 312 now has a relatively steeper negative slope, third free-pivoting link 313 has a negative slope that is less steep than the negative slope shown in FIG. 35, fourth free-pivoting link 314 has a negative slope that is less steep than the negative slope shown in FIG. 35, and fifth free-pivoting link 315 has a negative slope that is less steep than the negative slope shown in FIG. 35.

Second shell mount 32 includes a series of five free-pivoting links 321-325 and a stationary link foundation 320 comprising second link-anchor strip 3200 and first and second anchor mounts 3201, 3202 in an illustrative embodiment shown in FIG. 28. Second link-anchor strip 3200 mates with the underlying second strip-support surface 222 included in pan-support frame 220 as suggested in FIGS. 25 and 26. Each of anchor mounts 3201, 3202 is adapted to be coupled to a nearby portion of pan-support frame 220 to hold second link-anchor strip 3200 in mating engagement with second strip-support surface 222. Second shell mount 32 is similar in size, shape, and function to first shell mount 31 in an illustrative embodiment.

Free-pivoting links 311-315 and 321-325 are flexible and cooperate to provide means for supporting deformable seat shell 280 for controlled movement relative to first and second link foundations 310, 320 in response to movement of person 18 on seat bottom 14 that is initiated by person 18 or caused by exposure of the vehicle including vehicle seat 510 to an external impact force F. First and second link foundations 310, 320 are coupled to pan-support frame 220 to lie in a fixed position on pan-support frame 220 during movement of deformable seat shell 280 relative to pan-support frame 220.

Deformable seat shell 280 further includes a person-support panel 283 arranged to lie between and interconnect first and second side portions 281, 282 as shown, for example, in FIG. 27. In illustrative embodiments, person-support panel 283 includes a buttocks-support section 284, a left-leg support section 285, and a right-leg support section 286 as shown, for example, in FIGS. 27 and 28. Person-support panel 283 is formed to include a slot 287 located between forward portions of left-leg and right-leg sections 285, 286 as suggested in FIGS. 27 and 28 to free those sections 285, 286 for limited movement relative to one another under loads applied by a seated person 18 as such a person 18 changes position or posture on seat bottom 14. Left-leg and right-leg sections 285, 286 are able to flex independently of one another during a change in shape of deformable seat shell 280.

Buttocks-support section 284 is somewhat bowl shaped as suggest in FIGS. 27 and 28. Buttocks-support section 284 is formed to include several laterally extending slots 288 to enhance deformability and shape-changing characteristics of person-support panel 283.

Seat cover 240 is included in seat bottom 14 as suggested in FIG. 26. Seat cover 240 is adapted to cover an outer face of deformable seat shell 280 and includes an outer trim cover 241 and an inner pad 242 interposed between outer trim cover 241 and deformable seat shell 280 in an illustrative embodiment as suggested in FIG. 26.

Seat back 16 includes a backrest 161 and a headrest 162 that is arranged to extend upwardly from backrest 161 in an illustrative embodiment shown in FIG. 26. Backrest 161 is mounted on pan-support frame 220 (or other suitable structure) to extend upwardly from deformable seat shell 280 as suggested in FIG. 26.

An illustrative shape change of deformable seat shell 280 in accordance with the present disclosure is shown, for example, in FIGS. 29-36. Deformable seat shell 280 is characterized by a normal (as-molded) first seat-shell shape in FIGS. 29-31 and 35 and also by a passenger-generated or impact-generated second seat-shell shape in FIGS. 32-34 and 36.

A person 18 is seated on the top surface of deformable seat shell 280 of variable-shape seat pan 200 (the seat cover is not shown) when deformable seat shell 280 assumes the normal (as-molded) first seat-shell shape as suggested in FIG. 30. As suggested in FIG. 31, a person 18 is seated and restrained in vehicle seat 510 when deformable seat shell 280 is in the normal (as-molded) position and free-pivoting links 211-215 included in first shell mount 31 (and free-pivoting links 221-225 included in second shell mount 32) are also in normal (as-molded) positions prior to exposure of the vehicle including vehicle seat 510 to an external impact force F (shown in phantom since it has not yet been applied to the vehicle).

Figure 32:
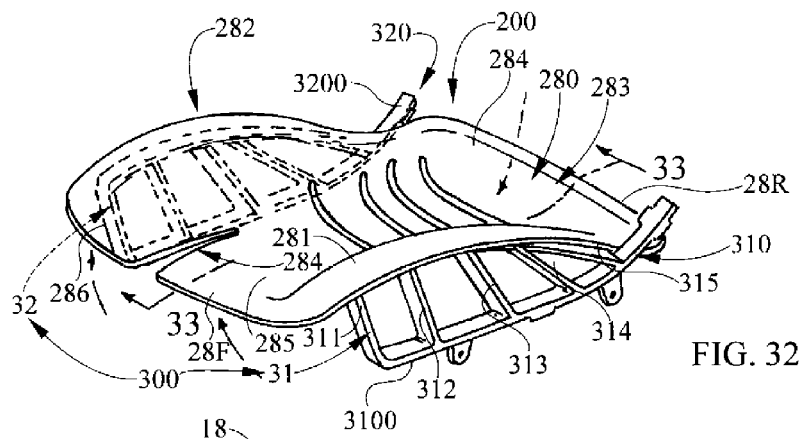
FIGS. 32-34 show the seat pan of FIGS. 24-28 after an external impact force (represented by a double arrow in FIG. 34) has been applied to the vehicle including the vehicle seat to cause the seated and restrained person to shift position and slide, for example, forwardly and downwardly in the vehicle seat and suggesting that such motion of the person in the vehicle seat causes the free-pivoting links in the first and second shell mounts to flex and the deformable seat shell to change shape to assume an impact-generated second seat-shell shape.

Variable-shape seat pan 200 is shown in FIGS. 32-34 after an external impact force F has been applied to the vehicle including vehicle seat 510 to cause the seated and restrained person 18 to shift position and slide, for example, forwardly and downwardly in vehicle seat 510 and suggesting that such motion of person 18 in vehicle seat 510 causes free-pivoting links 311-315 and 321-325 in first and second shell mounts 31, 32 to flex and deformable seat shell 280 to change shape to assume an impact-generated second seat-shell shape. As person 18 moves forward in response to application of external impact force F, a front edge 28F of deformable seat shell 280 rises and a rear edge 28F of deformable seat shell 280 drops as suggested in a sequence shown, for example, in FIGS. 30 and 33.

A person 18 is seated on the top surface of deformable seat shell 280 of variable-shape seat pan 200 (the seat cover is not shown) when deformable seat shell 280 is moved to assume the second seat-shell shape. Such shape-changing movement causes the knees of the seated person 18 to be raised upwardly away from the vehicle floor 13 as the bottom of the seated person 18 is lowered downwardly toward the underlying vehicle floor 13 to minimize forward sliding motion of the seated and restrained person 18 on seat bottom 14 during exposure of the vehicle to an external impact F as suggested in FIG. 34. When deformable seat shell 280 has been moved to assume the second seat-shell shape, free-pivoting links 311-315 included in first shell mount 31 (and free-pivoting links 321-325 included in second shell mount 32) have also moved to assume new slopes in response to exposure of the vehicle including the vehicle seat 510 to an external impact force F.

Variable-shape seat pan 200 includes a deformable seat shell 280 that passively and/or actively complies to the body of a person 18 in a predetermined way through the use of flexible links 311-315 in first shell mount 31 and flexible links 321-325 in second shell mount 32. Variable-shape seat pan 200 is configured and arranged to replace a traditional tilt function of a vehicle seat so as to minimize seat weight and cost. Variable-shape seat pan 200 is a monolithic element made of an elastic deformable plastics material in an illustrative embodiment. It is within the scope of this disclosure to overmold deformable seat shell 280 onto separate first and second spring units similar in function to first and second shell mounts 31, 32.

The invention claimed is:

1. A vehicle seat for use in a passenger vehicle, the vehicle seat comprising:
a seat foundation adapted to be anchored to a vehicle floor of the passenger vehicle;
an occupant-support base including a rigid pan-support frame coupled to the seat foundation and a variable-shape seat pan comprising a deformable seat shell and a compliant shell-motion controller located between the pan-support frame and the variable-shape seat pan and coupled to each of the pan-support frame and the variable-shape seat pan, wherein the compliant shell-motion controller is configured to provide means for elastically supporting the deformable seat shell for predictable shape-changing movement of the deformable seat shell relative to the pan-support frame from a first seat-shell shape to a second seat-shell shape sympathetically in response to a deformation force applied to the deformable seat shell in a direction toward the pan-support frame by a person sitting in the vehicle seat to engage the occupant-support base during a shift in position of the person sitting in the vehicle seat relative to the pan-support frame so that the deformable seat shell recovers its first seat-shell shape automatically after exposure of the deformable seat shell to the deformation force has ended,
wherein the deformable seat shell is defined by a thin pliable contoured sheet made of a pliable plastics material and formed to include a plurality of slots extending laterally between a first side and an opposite second side of the deformable seat shell, and wherein the compliant shell-motion controller includes a stationary link foundation and a plurality of free-pivoting links coupled to the link foundation and to the deformable seat shell, the link foundation being coupled to the pan-support frame to lie in a fixed position relative to the seat foundation and relative to the pan-support frame during shape-changing movement of the deformable seat shell relative to the pan-support frame, and the free-pivoting links being arranged between and interconnecting the link foundation and the deformable seat shell.

2. The vehicle seat of claim 1, wherein the compliant shell-motion controller includes a first shell mount coupled to the first side of the deformable seat shell and a second shell mount coupled to the opposite second side of the deformable seat shell.

3. The vehicle seat of claim 2, wherein the first and second shell mounts are arranged to lie in spaced-apart relation to one another and the deformable seat shell is arranged to interconnect the first and second shell mounts.

4. The vehicle seat of claim 3, wherein the deformable seat shell and the first and second shell mounts cooperate to form a monolithic element made of an elastic plastics material.

5. The vehicle seat of claim 3, wherein the first shell mount includes the stationary link foundation coupled to the pan-support frame and the plurality of free-pivoting links, each free-pivoting link in the first shell mount has one end coupled to the stationary link foundation and an opposite end coupled to the first side of the deformable seat shell and the second shell mount includes a stationary second link foundation coupled to the pan-support frame and several free-pivoting links, and each free-pivoting link in the second shell mount has one end coupled to the stationary link foundation and an opposite end coupled to the second side of the deformable seat shell.

6. The vehicle seat of claim 5, wherein the deformable seat shell and the first and second shell mounts cooperate to form a monolithic element made of an elastic plastics material.

7. The vehicle seat of claim 2, wherein the first shell mount includes the stationary link foundation coupled to the pan-support frame and the plurality of free-pivoting links, each free-pivoting link in the first shell mount has one end coupled to the stationary first link foundation and an opposite end coupled to the first side of the deformable seat shell, a first of the free-pivoting links is oriented to have a positive slope upon movement of the deformable seat shell to assume the first seat-shell shape, and a second of the free-pivoting links is oriented to have a negative slope upon movement of the deformable seat shell to assume the first seat-shell shape.

8. The vehicle seat of claim 7, wherein the vehicle seat further comprises a seat bottom, the occupant-support base is arranged to extend upwardly away from the seat bottom to provide a seat back, the deformable seat shell includes an upper shell portion arranged to lie above and in spaced-apart relation to the seat bottom and a lower shell portion coupled to the upper shell portion and located between the seat bottom and the upper shell portion, the first of the free-pivoting links is coupled to the upper shell portion, and the second of the free-pivoting links is coupled to the lower shell portion.

9. The vehicle seat of claim 7, wherein the vehicle seat further comprises a seat back, the occupant-support base is arranged to extend forwardly away from a lower portion of the seat back to provide a seat bottom, the deformable seat shell includes a forward leg-support portion arranged to lie in spaced-apart relation to the seat back and a rearward buttocks-support section coupled to the forward leg-support portion and located between the forward leg-support portion and the seat back, the first of the free-pivoting links is coupled to the forward leg-support portion, and the second of the free-pivoting links is coupled to the rearward buttocks-support portion.

10. The vehicle seat of claim 9, wherein the forward leg-support portion is formed to include a slot, a left-leg section located between the slot and the first side of the deformable seat shell, and a right-leg section located between the slot and the opposite second side of the deformable seat shell and free to flex independently of the left-leg section for limited movement relative to the left-leg section under loads applied by a person seated on the occupant-support base as such a person shifts position on the occupant-support base to change the shape of the deformable seat shell.

11. The vehicle seat of claim 1, wherein the vehicle seat further comprises a seat bottom, the occupant-support base is arranged to extend upwardly from the seat bottom to provide a seat back, the pan-support frame is arranged to extend upwardly away from the seat bottom, and the variable-shape seat pan is arranged to lie above the seat bottom to provide a backrest.

12. The vehicle seat of claim 11, wherein the seat bottom includes a pan-support frame arranged to extend forwardly away from a lower portion of the pan-support frame of the occupant-support base providing the seat back and a variable-shape seat pan lying above the pan-support frame of the seat bottom, and the variable-shape seat pan of the seat bottom comprises a deformable seat shell and a compliant shell-motion controller located between the pan-support frame of the seat bottom and the variable-shape seat pan of the seat bottom and coupled to each of the pan-support frame of the seat bottom and the variable-shape seat pan of the seat bottom, and wherein the compliant shell-motion controller of the seat bottom is configured to provide means for elastically supporting the deformable seat shell of the seat bottom for predictable shape-changing movement relative to the underlying pan-support frame of the seat bottom from a first seat-shell shape to a second seat-shell shape sympathetically in response to a deformation force applied to the deformable seat shell of the seat bottom in a direction toward the underlying pan-support frame of the seat bottom by a person sitting on the deformable seat shell of the seat bottom during a shift in position of the person relative to the underlying pan-support frame so that the deformable seat shell of the seat bottom recovers its first seat-shell shape automatically after exposure of the deformable seat shell of the seat bottom to the deformation force has ended.

13. The vehicle seat of claim 12, wherein the compliant shell-motion controller of the seat bottom includes a first shell mount coupled to a first side of the deformable seat shell of the variable-shape seat pan of the seat bottom and a second shell mount coupled to a second side of the deformable seat shell of the variable-shape seat pan of the seat bottom and the compliant shell-motion controller of the seat back includes a first shell mount coupled to a first side of the deformable seat shell of the seat back and a second shell mount coupled to a second side of the deformable seat shell of the variable-shape seat pan of the seat back.

14. The vehicle seat of claim 13, wherein each of the shell mounts of the seat bottom and back includes a link foundation and several free-pivoting links coupled to the link foundation.

15. The vehicle seat of claim 1, wherein the vehicle seat further comprises a seat back, the occupant-support base is arranged to extend forwardly away from a lower portion of the seat back to provide a seat bottom, and the pan-support frame is arranged to extend forwardly away from the lower portion of the seat back to underlie and support the variable-shape seat pan of the seat bottom in a position in front of the seat back.

16. The vehicle seat of claim 1, wherein the vehicle seat further comprises a seat bottom and a headrest and wherein the occupant-support base is arranged to extend upwardly away from the seat bottom to provide a seat back, the headrest comprises a compliant head-restraint shuttle coupled to an upper portion of the variable-shape seat pan to move therewith, a base coupled to an upper portion of the pan-support frame, and a shuttle guide coupled to a forward-facing portion of the base of the headrest and arranged to extend in a forward direction toward the compliant head-restraint shuttle, and the shuttle guide is arranged to engage and guide the compliant head-restraint shuttle as the compliant head-restraint shuttle moves between a forwardly displaced position and a rearwardly displaced position.

17. The vehicle seat of claim 16, wherein the compliant head-restraint shuttle includes a head pad and a guide receiver coupled to the head pad to move therewith and configured to form a channel receiving the shuttle guide therein.

18. The vehicle seat of claim 17, wherein the compliant head-restraint shuttle further includes a compliant member interconnecting the variable-shape seat pan and the head pad.

19. The vehicle seat of claim 18, wherein the compliant head-restraint shuttle is an elastic, pliable, monolithic element made of a plastics material.

20. The vehicle seat of claim 16, wherein the variable-shape seat pan and the compliant head-restraint shuttle cooperate to form an elastic, pliable, monolithic element made of a plastics material.

21. A vehicle seat for use in a passenger vehicle, the vehicle seat comprising:
a seat foundation adapted to be anchored to a vehicle floor of the passenger vehicle;
a seat bottom mounted on the seat foundation, and
a seat back arranged to extend upwardly from the seat bottom, wherein each of the seat bottom and seat back includes a rigid pan-support frame coupled to the seat foundation and a companion variable-shape seat pan coupled to the pan-support frame and configured to change shape in response to movement of an occupant seated thereon, wherein each variable-shape seat pan comprises a deformable seat shell and a compliant shell-motion controller configured to include a stationary link foundation coupled to a companion one of the pan-support frames to lie in a fixed position relative to the seat foundation and relative to the pan-support frame during shape-changing movement of the deformable seat shell relative to the pan-support frame and several free-pivoting links arranged to lie between and interconnect the stationary link foundation and the deformable seat shell and cooperate to provide means for causing the deformable seat shell to move sympathetically in a controlled manner relative to the stationary link foundation and the companion one of the pan-support frames when the deformable seat shell is exposed to external forces generated by an occupant moving around and changing position on the vehicle seat,
wherein each deformable seat shell is defined by a thin pliable contoured sheet made of a pliable plastics material and formed to include a plurality of slots extending laterally between a first side and an opposite second side of the deformable seat shell.

22. The vehicle seat of claim 21, wherein the deformable seat shell and free-pivoting links and link foundation in each compliant shell-motion controller cooperate to form a monolithic element made of an elastic plastics material.

23. The vehicle seat of claim 21, wherein the seat back further includes a headrest comprising a compliant head-restraint shuttle coupled to an upper portion of the variable-shape seat pan included in the seat back to move therewith, a base coupled to an upper portion of the pan-support frame included in the seat back, and a shuttle guide coupled to a forward-facing portion of the base of the headrest and arranged to extend in a forward direction toward the compliant head-restraint shuttle, and the shuttle guide is arranged to engage and guide the compliant head-restraint shuttle as the compliant head-restraint shuttle moves relative to the pan-support frame included in the seat back between a forwardly displaced position and a rearwardly displaced position.

\* \* \* \* \*